United States Patent
Seki

(10) Patent No.: US 8,742,743 B2
(45) Date of Patent: *Jun. 3, 2014

(54) SWITCHING CONTROL CIRCUIT

(75) Inventor: Masao Seki, Oizumi-machi (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/314,279

(22) Filed: Dec. 8, 2011

(65) Prior Publication Data

US 2012/0146604 A1    Jun. 14, 2012

(30) Foreign Application Priority Data

Dec. 14, 2010  (JP) .................................. 2010-278425

(51) Int. Cl.
    *H02M 3/156*    (2006.01)

(52) U.S. Cl.
    USPC ............................ 323/284; 323/285; 323/288

(58) Field of Classification Search
    USPC .......................... 323/222, 225, 282–290, 351
    See application file for complete search history.

(56) References Cited

U.S. PATENT DOCUMENTS

| | | | | |
|---|---|---|---|---|
| 7,605,573 B2* | 10/2009 | Nishida | .......................... | 323/282 |
| 8,169,205 B2* | 5/2012 | Chen et al. | ..................... | 323/282 |
| 8,207,721 B2* | 6/2012 | Sohma | .......................... | 323/282 |
| 8,242,764 B2* | 8/2012 | Shimizu et al. | ............... | 323/285 |
| 8,344,711 B2* | 1/2013 | Futamura | ...................... | 323/224 |
| 2011/0101944 A1* | 5/2011 | Uchiike | ........................ | 323/282 |
| 2012/0146609 A1* | 6/2012 | Seki | ............................. | 323/284 |

FOREIGN PATENT DOCUMENTS

JP    2004-104942 A    4/2004

* cited by examiner

*Primary Examiner* — Jessica Han

(74) *Attorney, Agent, or Firm* — Polansky & Associates, P.L.L.C.; Paul J. Polansky

(57) ABSTRACT

A switching-control circuit to control a switching operation of a transistor, having an input electrode applied with the input voltage and an output electrode connected to a load via an inductor, to generate an output voltage of a target level from an input voltage, includes: a voltage-generating circuit to generate a slope voltage based on the output voltage in each of a switching period of the transistor, the slope voltage changing with a slope corresponding to the output voltage; an adding circuit to add the slope voltage to a reference voltage, indicating a reference of the output voltage of the target level, or a feedback voltage corresponding to the output voltage; and a drive circuit to perform the switching operation of the transistor, when a level of either one voltage, added with the slope voltage, of the reference and feedback voltages reaches a level of an other voltage thereof.

4 Claims, 20 Drawing Sheets

# SWITCHING CONTROL CIRCUIT

CROSS-REFERENCE TO RELATED APPLICATION

This application claims the benefit of priority to Japanese Patent Application No. 2010-278425, filed Dec. 14, 2010, of which full contents are incorporated herein by reference.

BACKGROUND OF THE INVENTION

1. Field of the Invention

The present invention relates to a switching control circuit.

2. Description of the Related Art

With respect to a switching power supply circuit configured to generate an output voltage of a target level from an input voltage, a power supply circuit of a type called a ripple converter or a hysteresis control regulator (see, e.g., Japanese Laid-Open Patent Publication No. 2004-104942) is known. FIG. 20 depicts one example of a ripple converter 300 of a common fixed-on-time system. When a feedback voltage Vfb corresponding to an output voltage Vout decreases to be lower than a reference voltage Vref, a control circuit 410 turns on an NMOS transistor 420 for a predetermined time. As a result, the output voltage Vout increases. When the output voltage Vout is decreased by an effect of a load and the feedback voltage Vref becomes lower than the reference voltage Vref, the control circuit 410 again turns on the NMOS transistor 420 for the predetermined time. Such an operation is repeated, thereby generating the output voltage Vout of the target level.

Incidentally, in the ripple converter 300, a ceramic capacitor 440 with small ESR (Equivalent Series Resistance) is occasionally employed to reduce a ripple voltage of the output voltage Vout. In such a case, the ripple voltage contained in the feedback voltage Vfb becomes small, which may leads to unstable operation of the ripple converter 300. Thus, in order to operate the ripple converter 300 in a stable manner, an adjusting circuit (not shown) which adjusts a gain and a phase of the feedback voltage Vfb and a circuit (not shown) that is configured to generate the ripple voltage based on a current flowing through an inductor 430 and adds the generated voltage to feedback voltage Vfb are used, for example (see Japanese Laid-Open Patent Publication No. 2004-104942). However, since the values of elements such as a resistor, a capacitor, etc., included in these circuits is generally large, the adjusting circuit, etc., cannot be included in the control circuit 410 when the control circuit 410 is integrated, thereby increasing the number of external components of the ripple converter 300.

SUMMARY OF THE INVENTION

A switching control circuit according to an aspect of the present invention, which controls a switching operation of a transistor to generate an output voltage of a target level from an input voltage, the transistor having an input electrode applied with the input voltage and an output electrode connected to a load via an inductor, the switching control circuit comprising: a voltage generating circuit configured to generate a slope voltage based on the output voltage in each of a switching period of the transistor, the slope voltage changing with a slope corresponding to the output voltage; an adding circuit configured to add the slope voltage to a reference voltage or a feedback voltage, the reference voltage indicating a reference of the output voltage of the target level, the feedback voltage corresponding to the output voltage; and a drive circuit configured to perform the switching operation of the transistor, when a level of either one voltage, added with the slope voltage, of the reference voltage and the feedback voltage reaches a level of an other voltage thereof.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 5 is a diagram illustrating a major waveform of a ripple converter 10a;

FIG. 6 is a diagram illustrating a major waveform of a ripple converter 10a;

FIG. 13 is a diagram illustrating a major waveform of a ripple converter 11a;

FIG. 14 is a diagram illustrating a major waveform of a ripple converter 11a;

DETAILED DESCRIPTION OF THE INVENTION

At least the following details will become apparent from descriptions of this specification and of the accompanying drawings.

Figure 1:
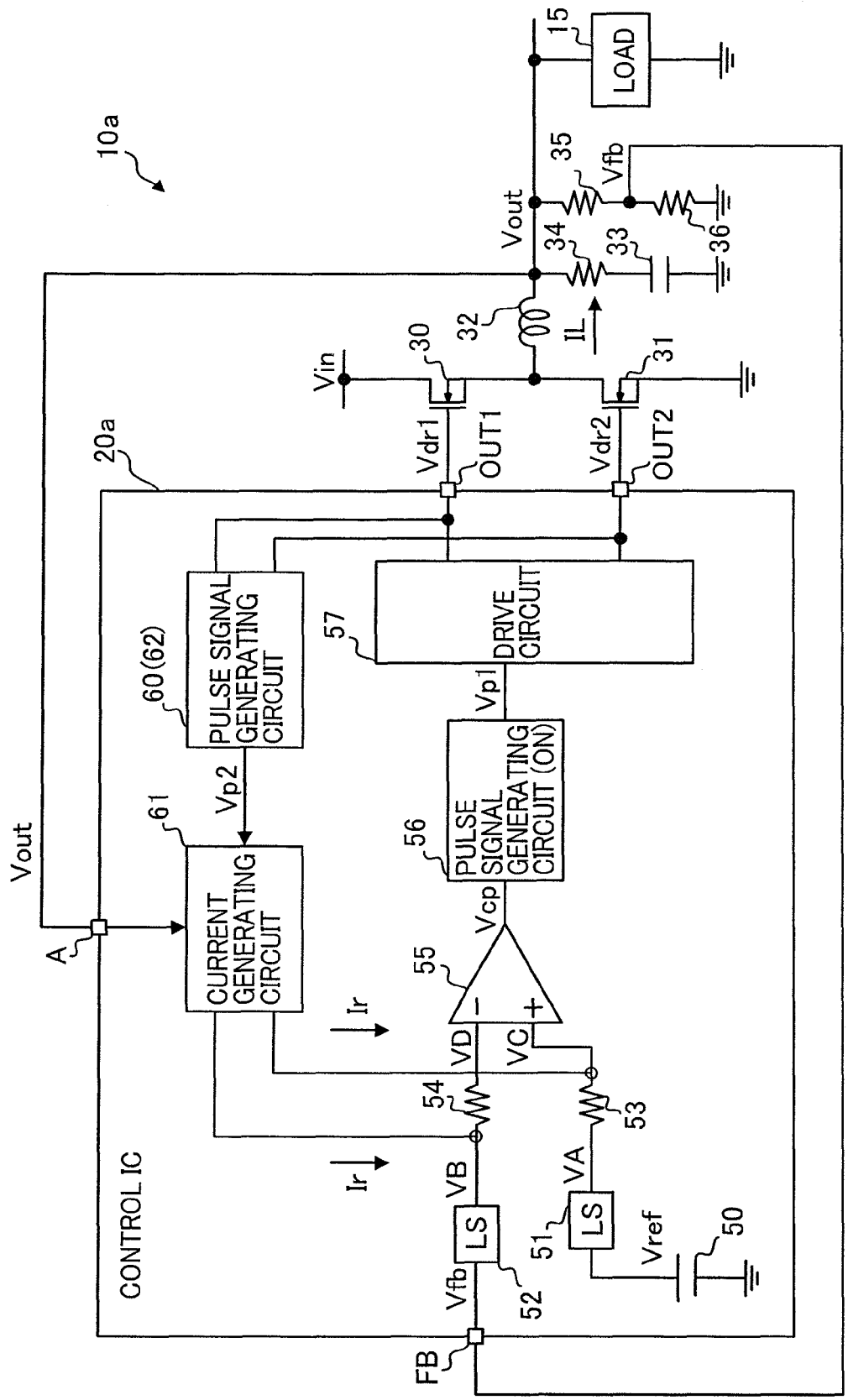
FIG. 1 is a diagram illustrating a configuration of a ripple converter 10a according to a first embodiment of the present invention.

FIG. 1 depicts a configuration of a ripple converter 10a of a fixed-on-time system according to a first embodiment of the present invention. The ripple converter 10a is a circuit configured to generate an output voltage Vout of a target level from an input voltage Vin, for example, and includes a control IC (Integrated Circuit) 20a, NMOS transistors 30 and 31, an inductor 32, a capacitor 33, and resistors 34 to 36. In the ripple converter 10a, in order that the ripple converter 10a is in a stable manner operated, a slope voltage Vs, which changes with the slope corresponding to the level of the output voltage Vout, is added to a reference voltage Vref.

A load 15 is an integrated circuit such as a CPU (Central Processing Unit), for example, and is configured to operate using the output voltage Vout as a power supply voltage.

The control IC (switching control circuit) 20a is an integrated circuit configured to control switching operations of the NMOS transistors 30 and 31 based on a feedback voltage Vfb obtained by dividing the output voltage Vout by the resistors 35 and 36. The control IC 20a is provided with terminals A, FB, OUT1, and OUT2.

The output voltage Vout is applied to the terminal A, and the feedback voltage Vfb is applied to the terminal FB.

The gate electrode of the NMOS transistor 30 is connected to the terminal OUT1, and the gate electrode of the NMOS transistor 31 is connected to the terminal OUT2.

The control IC 20a includes a reference voltage generating circuit 50, level shift circuits 51 and 52, resistors 53 and 54, a comparator 55, pulse signal generating circuits 56 and 60, a drive circuit 57, and a current generating circuit 61.

The reference voltage generating circuit 50 is configured to generate a predetermined reference voltage Vref such as a bandgap voltage, for example.

Figure 2:
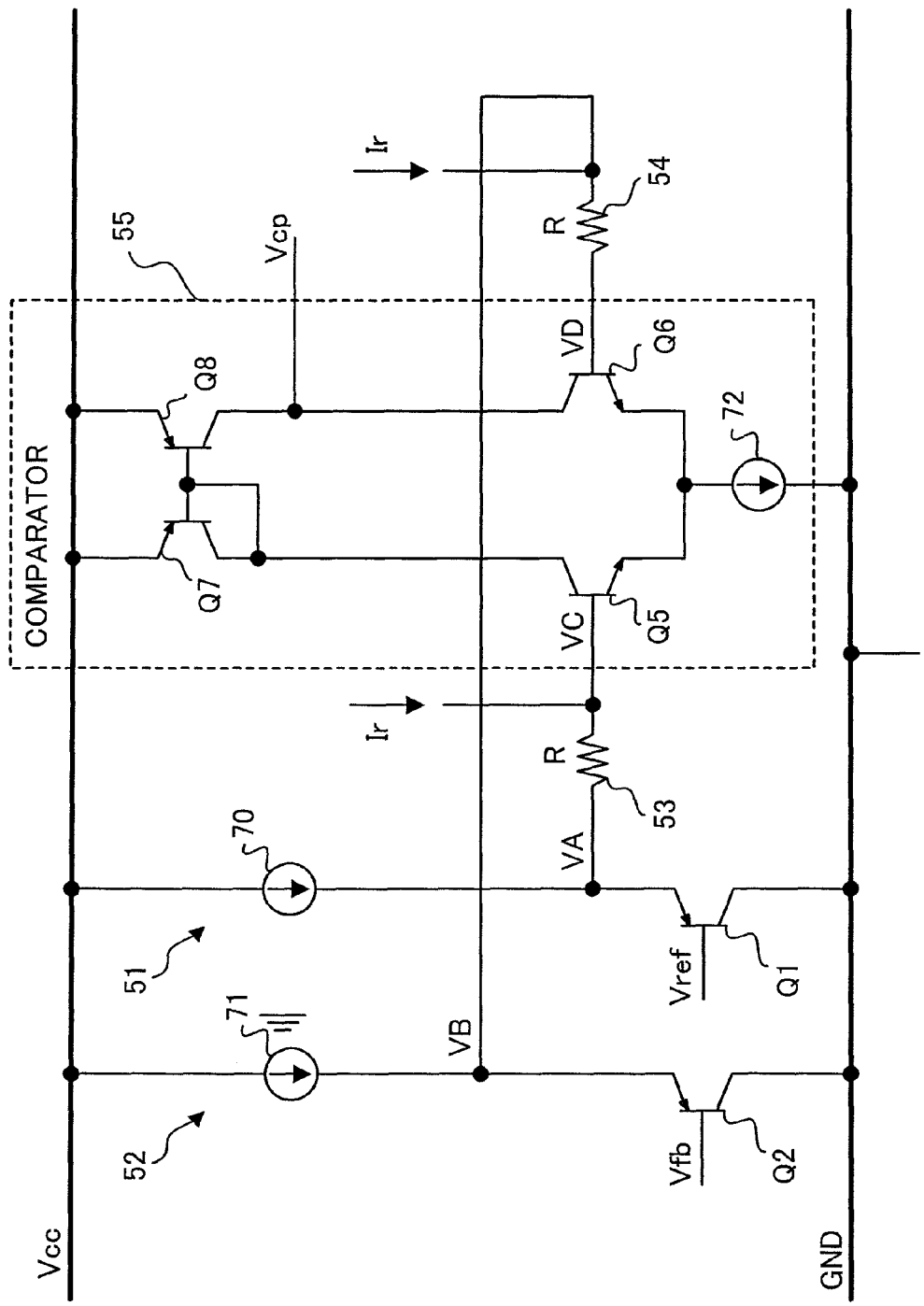
FIG. 2 is a diagram illustrating a configuration of level shift circuits 51 and 52 and a comparator 55.

The level shift circuit 51 is a circuit configured to output a voltage VA obtained by shifting the level of the reference voltage Vref to one end of the resistor 53 and, as shown in FIG. 2, includes the a PNP transistor Q1 and a constant current source 70. Since the PNP transistor Q1 and the constant current source 70 make up an emitter follower, the voltage VA is given by VA=Vref+Vbe1 (Vbe1: base-emitter voltage of PNP transistor Q1). The voltage Vcc is a voltage of a so-called internal power supply generated inside the control IC 20a, for example.

The level shift circuit 52 is a circuit configured to output a voltage VB obtained by shifting the level of the feedback voltage Vfb to one end of the resistor 54, and includes a PNP transistor Q2 and a constant current source 71. Since the PNP transistor Q2 and the constant current source 71 make up an emitter follower, the voltage is given by VB=Vfb+Vbe2 (Vbe2: base-emitter voltage of PNP transistor Q2). The circuit is so designed that current values are equal between the constant current sources 70 and 71 so that the voltage Vbe1 is equal to the voltage Vbe2.

The other end of the resistor 53 is connected to a non-inverting input terminal of the comparator 55, and the other end of the resistor 54 is connected to an inverting input terminal of the comparator 55. Here, the voltage of the non-inverting input terminal of the comparator 55 is referred to as VC, and the voltage of the inverting input terminal thereof is referred to as VD.

The comparator 55 is configured to compare the voltage VC and the voltage VD, and outputs a comparison voltage Vcp indicative of a result of the comparison. The comparator 55 includes a constant current source 72, NPN transistors Q5 and Q6, and PNP transistors Q7 and Q8.

The constant current source 72 and the NPN transistors Q5 and Q6 make up a differential input circuit, and each of the PNP transistors Q7 and Q8 operates as a current source. For this reason, the comparator 55 outputs the comparison voltage Vcp of a low level (hereinafter, low comparison voltage) when the voltage VD is higher than the voltage VC, and outputs the comparison voltage Vcp of a high level (hereinafter, high comparison voltage) when the voltage VD is lower than the voltage VC.

The pulse signal generating circuit 56 is a so-called one-shot circuit, and is configured to generate a pulse signal Vp1 which goes high only for a predetermined time T1 when the comparison voltage Vcp goes high.

When the pulse signal Vp1 goes high, the drive circuit 57 outputs a low drive signal Vdr2 to turn off the NMOS transistor 31, and thereafter, outputs a high drive signal Vdr1 only for the predetermined time T1 to turn on the NMOS transistor 30. When the pulse signal Vp1 goes low, the drive circuit 57 outputs the low drive signal Vdr1 to turn off the NMOS transistor 30, and thereafter, outputs the high drive signal Vdr2 to turn on the NMOS transistor 31. As such, the drive circuit 57 performs switching of the NMOS transistors 30 and 31 in a complementary manner by providing a so-called dead-time so that both of the NMOS transistors 30 and 31 are not on at the same time.

The pulse signal generating circuit 60 is configured to generate a pulse signal Vp2 that goes high in each of a switching period, for example, in every dead-time period immediately before the NMOS transistor 30 is turned on. That is to say, the pulse signal generating circuit 60 outputs the high pulse signal Vp2 in a time period in which the drive signal Vdr1 is low and the drive signal Vdr2 goes low from high.

The current generating circuit 61 is configured to generate a current Ir, which changes with the slope corresponding to the level of the output voltage Vout, every time the pulse signal Vp2 goes low from high. Specifically, the current generating circuit 61 is configured to generate the current Ir which reaches zero while the pulse signal Vp2 is high and increases with the slope corresponding to the level of the output voltage Vout when the pulse signal Vp2 goes low. The current generating circuit 61 changes the level of the reference voltage Vref by supplying the current Ir to a node at which the resistor 53 and the non-inverting terminal of the comparator 55 are connected.

The voltage VC is given by $$VC = VA + Ir \times R = Vref + Vbe1 + Ir \times R \quad (1)$$

where the resistance value of the resistor 53 is R, the current value of the current Ir is Ir, and the input impedance of the comparator 55 is assumed infinite.

The current generating circuit 61 supplies the current Ir to the node at which the level shift circuit 52 and the resistor 54 are connected so that the voltage Vbe1 is equal to the voltage Vbe2, namely, so that the offset of the comparator 55 is cancelled.

Thus, the voltage VD is given by $$VD = VB = Vfb + Vbe2 = Vfb + Vbe1 \quad (2)$$

The current generating circuit 61 and the resistor 53 correspond to a voltage generating circuit, and the level shift circuit 51 and the resistor 53 correspond to an adding circuit. The current generating circuit 61 will be described later in detail.

The NMOS transistor 30 is a high-side (power-supply side) power transistor, and has a drain electrode (input electrode) applied with an input voltage Vin and source electrode (output electrode) connected to the drain electrode of the NMOS transistor 31 and the inductor 32.

The NMOS transistor 31 is a low-side (ground side) power transistor, and has a source electrode (output electrode) that is grounded and a drain electrode connected to the inductor 32.

The inductor 32 and the capacitor 33 forms an LC filter to smooth the voltage at the node at which the NMOS transistors 30 and 31 are connected. Here, a current running through the inductor 32 is referred to as an inductor current IL.

The resistor 34 is an ESR (Equivalent Series Resistance) of the capacitor 33. Since the capacitor 33 is a ceramic capacitor, for example, the resistance value of the resistor 34 is a small value of several mΩ, etc., for example. For this reason, a ripple voltage contained in the output voltage Vout also is small.

==Details of Current Generating Circuit 61==

Figure 3:
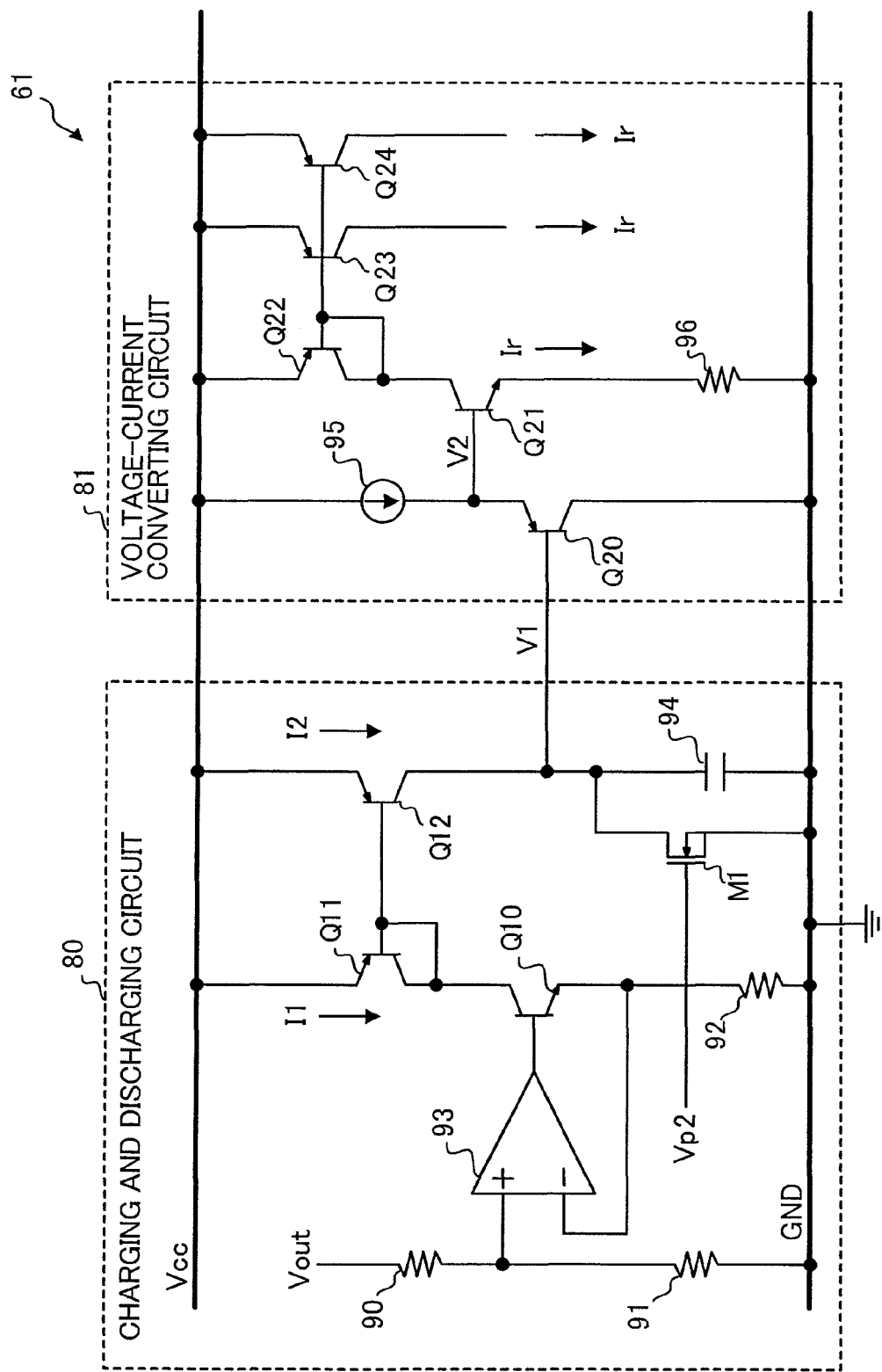
FIG. 3 is a diagram illustrating a configuration of a current generating circuit 61.

A specific configuration of the current generating circuit 61 will be described with reference to FIG. 3. The current generating circuit 61 includes a charging and discharging circuit 80 and a voltage-current converting circuit 81.

The charging and discharging circuit 80 is configured to charge the capacitor 94, which is discharged every time the pulse signal Vp2 goes low from high, and generate a voltage V1, which changes with the slope corresponding to the level of the output voltage Vout. The charging and discharging circuit 80 includes resistors 90 to 92, an operational amplifier 93, the capacitor 94, an NPN transistor Q10, PNP transistors Q11 and Q12, and an NMOS transistor M1.

The resistors 90 and 91 apply a voltage obtained by dividing the output voltage Vout to the non-inverting terminal of the operation amplifier 93.

The base electrode of the NPN transistor Q10 is connected to the output of the operational amplifier 93, and the emitter electrode thereof is connected to the inverting terminal of the operational amplifier 93. Therefore, the operational amplifier 93 controls the NPN transistor Q10 so that the voltage of the inverting terminal will become equal to the voltage applied to the non-inverting terminal. As a result, the voltage applied to the resistor 92 is equal to a divided voltage, and therefore, a current I1, which is inversely proportional to the resistance value of the resistor 92 and proportional to the level of the output voltage Vout, flows through the NPN transistor Q10. The current I1 flows through the diode-connected PNP transistor Q11.

Figure 4:
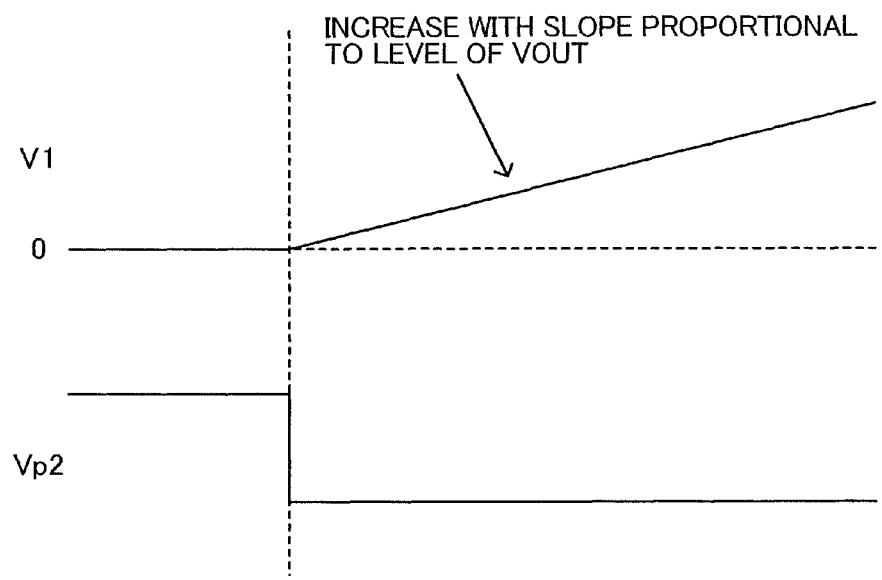
FIG. 4 is a diagram illustrating one example of a waveform of a voltage V1 when a pulse signal Vp2 goes low from high.

Since the PNP transistors Q11 and Q12 make up a current mirror circuit, a current I2 flowing through the PNP transistor Q12 also is a current proportional to the output voltage Vout. The drain electrode of the NMOS transistor M1 and the capacitor 94 are connected to the collector electrode of the PNP transistor Q12. Therefore, in the case where the pulse signal Vp2 is high, for example, since the NMOS transistor M1 is on, the voltage V1, which is a charging voltage of the capacitor 94, becomes almost zero. On the other hand, in the case where the pulse signal Vp2 is low, since the NMOS transistor M1 is off, the capacitor 94 is charged with the current I2 which is proportional to the output voltage Vout. That is to say, as illustrated in FIG. 4, when the pulse signal Vp2 goes low from high, the charging and discharging circuit 80 is configured to charge the capacitor 94 and cause the level of the voltage V1 to increase from zero with the slope proportional to the level of the output voltage Vout.

The voltage-current converting circuit 81 is a circuit configured to generate the current Ir of a value corresponding to the level of the voltage V1, and includes a constant current source 95, a resistor 96, PNP transistors Q20 and Q22 to Q24, and an NPN transistor Q21.

The PNP transistor Q20 and the constant current source 95 make up an emitter follower circuit. Thus, at the emitter electrode of the PNP transistor Q20, a voltage V2(=V1+Vbe20) corresponding to the voltage V1 is generated. Here, the base-emitter voltage of the PNP transistor Q20 is referred to as Vbe20.

The voltage V2 is applied to the base electrode of the NPN transistor Q21, and the resistor 96 is connected to the emitter electrode thereof. An embodiment according to the present invention is designed such that when the voltage V1 is zero and the voltage V2 is Vbe20 described above, the NPN transistor Q21 is turned off. Thus, when the voltage V1 is zero, the current Ir flowing through the NPN transistor Q21 is zero. On the other hand, when the voltage V1 increases from zero, the current Ir, which is inversely proportional to the resistance value of the resistor 96 and proportional to the level of the voltage V2, flows through the NPN transistor Q21.

The current Ir flows through the diode-connected PNP transistor Q22, and the PNP transistors Q22 to Q24 make up a current mirror circuit. In an embodiment of the present invention, since the PNP transistors Q22 to Q24 are the same in transistor size, the PNP transistors Q23 and Q24 operate as a current source supplying the current Ir which is proportional to the level of the voltage V2.

Incidentally, similarly to the voltage V1, the voltage V2 changes with the slope proportional to the level of the output voltage Vout. Therefore, the current Ir also changes with the slope proportional to the level of the output voltage Vout.

==Operation of Ripple Converter 10a==

Figure 5:
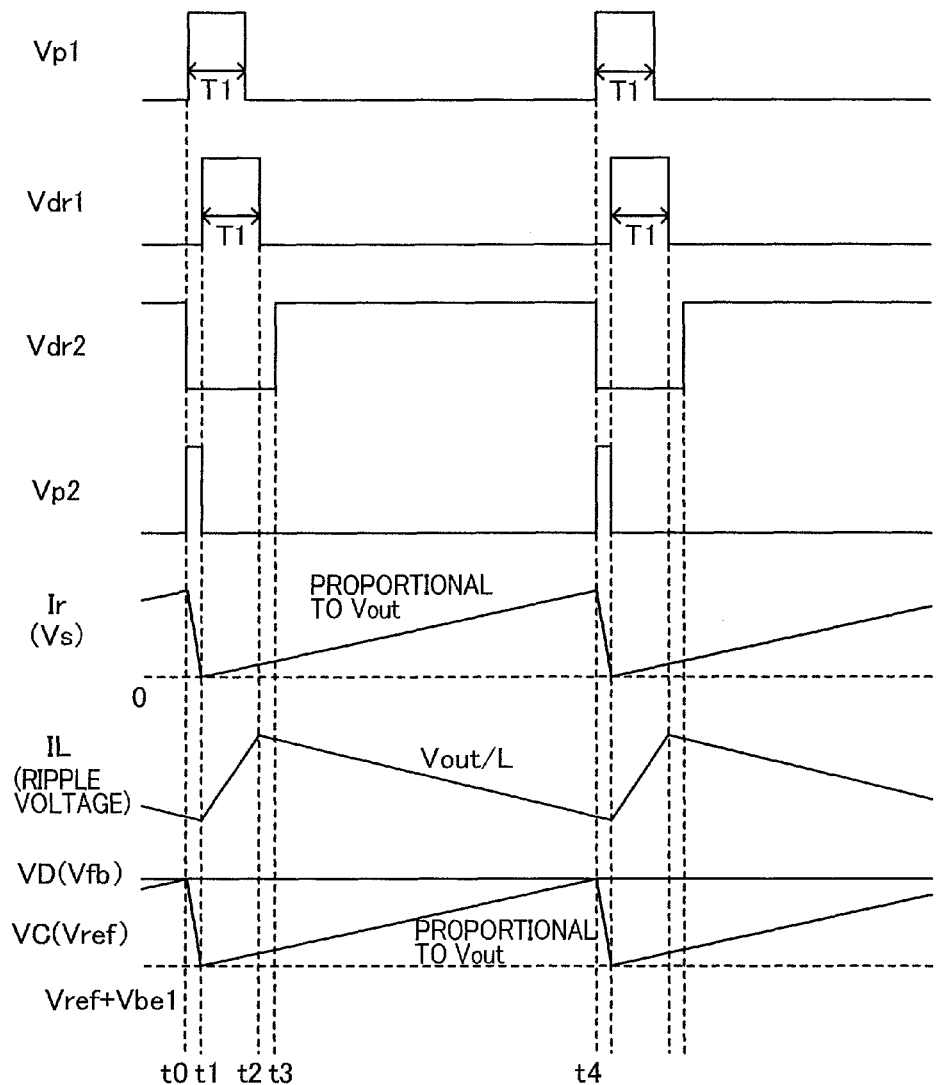

The operation of the ripple converter 10a will now be described with reference to FIGS. 1 and 5. In an embodiment of the present invention, since the ripple voltage contained in the output voltage Vout is sufficiently small, the ripple voltage contained in the feedback voltage Vfb is also sufficiently small. That is to say, the level of the feedback voltage Vfb, namely, the level of the voltage VD, when the output voltage Vout of the target level is being generated becomes almost constant.

At time t0 when the voltage VC (one voltage) increases to the level of the voltage VD (the other voltage), since the comparison voltage Vcp goes high, the high pulse signal Vp1 is output. Thus, the drive signal Vdr2 goes low so as to turn off the NMOS transistor 31, and the pulse signal Vp2 goes high. As a result, the current Ir supplied by the current generating circuit 61 reaches zero and the voltage VC decreases to VC=vref+Vbe1.

At time t1 when the dead-time has elapsed from time 0, the drive signal Vdr1 goes high so as to turn on the NMOS transistor 30. As a result, the pulse signal Vp2 goes low, and therefore, the current Ir increases with the slope proportional to the level of the output voltage Vout.

Similarly to the current Ir, the voltage VC also increases with the slope proportional to the level of the output voltage Vout.

At time t2 when the predetermined time T1 has elapsed from time t1, the drive signal Vdr1 goes low so as to turn off the NMOS transistor 30. At time t3 when the dead-time has elapsed from time t2, the drive signal Vdr2 goes high so as to turn on the NMOS transistor 31.

Thereafter, at time t4 when the voltage VC increases to the level of the voltage VD, the operation at time t0 is repeated.

Incidentally, the voltage across the inductor 32 when the NMOS transistor 30 is off and the NMOS transistor 31 is on is equal to the output voltage Vout. Thus, during a time period during which the NMOS transistor 31 is on, an inductor current IL decreases with the slope proportional to the level of the output voltage Vout and inversely proportional to the inductance L of the inductor 32. Since the inductance L is a predetermined value, the inductor current IL during the time period during which the NMOS transistor 31 is on is substantially proportional to the level of the output voltage Vout.

In the ripple converter 10a, although the ripple voltage or a voltage analogous to the ripple voltage is not added to the reference voltage Vref, the voltage (Ir×R) of such a slope that the voltage changes in a similar manner to the ripple voltage is added to the reference voltage Vref during the time period during which the NMOS transistor 30 is off. That is to say, in an embodiment of the present invention, in order to detect the timing of turning on the NMOS transistor 30, the voltage VC is changed with the slope (proportional to Vout) similar to the slope (proportional to Vout/L) of the ripple voltage during the time period during which the NMOS transistor 30 is off (e.g., time t2 to time t4).

Therefore, the ripple converter 10a operates in a stable manner similarly to common ripple converters in which the ripple voltage is added to the reference voltage Vref, for example. That is to say, the ripple converter 10a operates in a stable manner without using an external component, etc., to detect the inductor current IL, etc.

==Timing of Change in Voltage VC==

In the ripple converter 10a, it is assumed that the voltage VC increases at the timing of time t1. In order to stabilize the operation of the ripple converter 10a, however, it is only required that the slope (proportional to Vout) of the voltage VC during the time period during which the NMOS transistor 30 is off is similar to the slope (proportional to Vout/L) of the ripple voltage. Thus, as illustrated in FIG. 1, for example, a pulse signal generating circuit 62 may be used in place of the pulse signal generating circuit 60.

Figure 6:
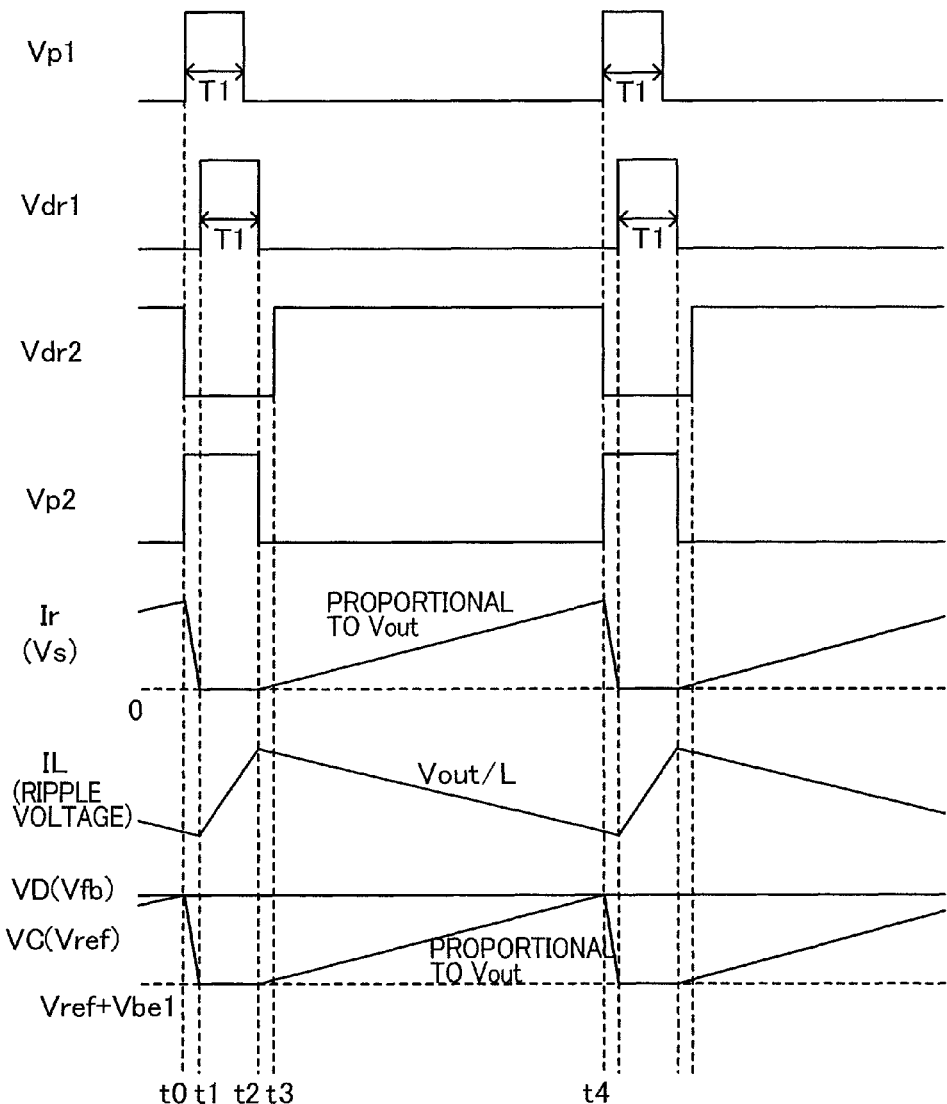

The pulse signal generating circuit 62 outputs the pulse signal Vp2 which is high from the time when the drive signal Vdr2 goes low until the time when the drive signal Vdr1 goes low, as illustrated in FIG. 6, for example. In such a case, the voltage VC starts to increase at time t2, and the slope of the voltage VC during the time period during which the NMOS transistor 30 is off becomes similar to the slope of the ripple voltage. Therefore, even in such a case, the ripple converter 10a operates in a stable manner.

Second Embodiment

Figure 7:
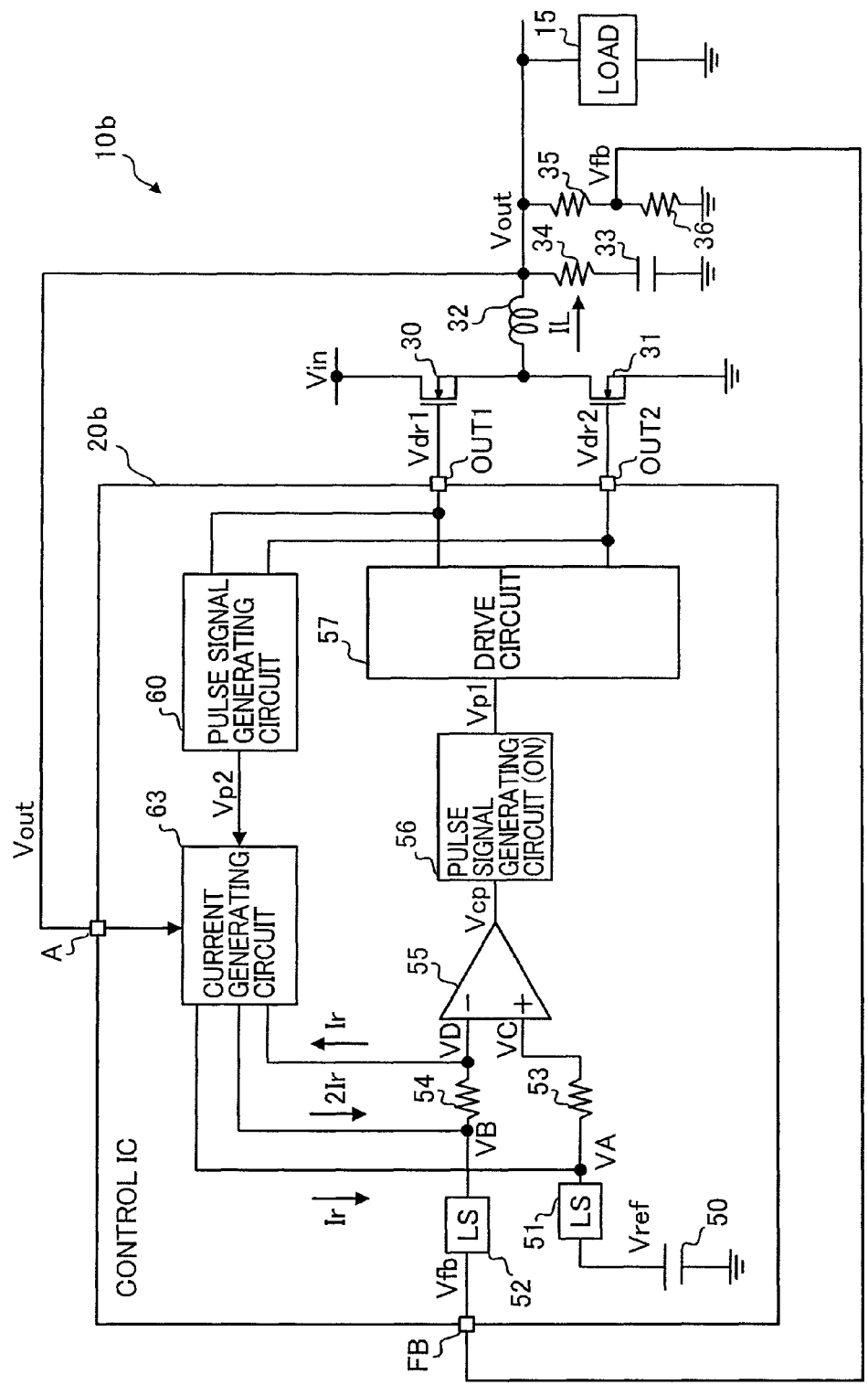
FIG. 7 is a diagram illustrating a configuration of a ripple converter 10b according to a second embodiment of the present invention.

FIG. 7 depicts a configuration of a ripple converter 10b of the fixed-on-time system according to a second embodiment of the present invention.

In the ripple converter 10b, in order to operate the ripple converter 10b in a stable manner, the slope voltage Vs, which changes with the slope corresponding to the level of the output voltage Vout, is added to the feedback voltage Vfb. In the present specification, blocks equivalent to those in FIG. 1 are designated by the same reference numerals, for example. When comparing FIG. 1 and FIG. 7, a control IC 20b includes a current generating circuit 63 in place of the current generating circuit 61.

The current generating circuit 63 is configured to generate a source current (currents Ir and 2×Ir (hereinafter referred to as 2Ir)) and a sink current (current Ir) that change with the slope corresponding to the output voltage Vout, every time the pulse signal Vp2 goes low from high.

Figure 8:
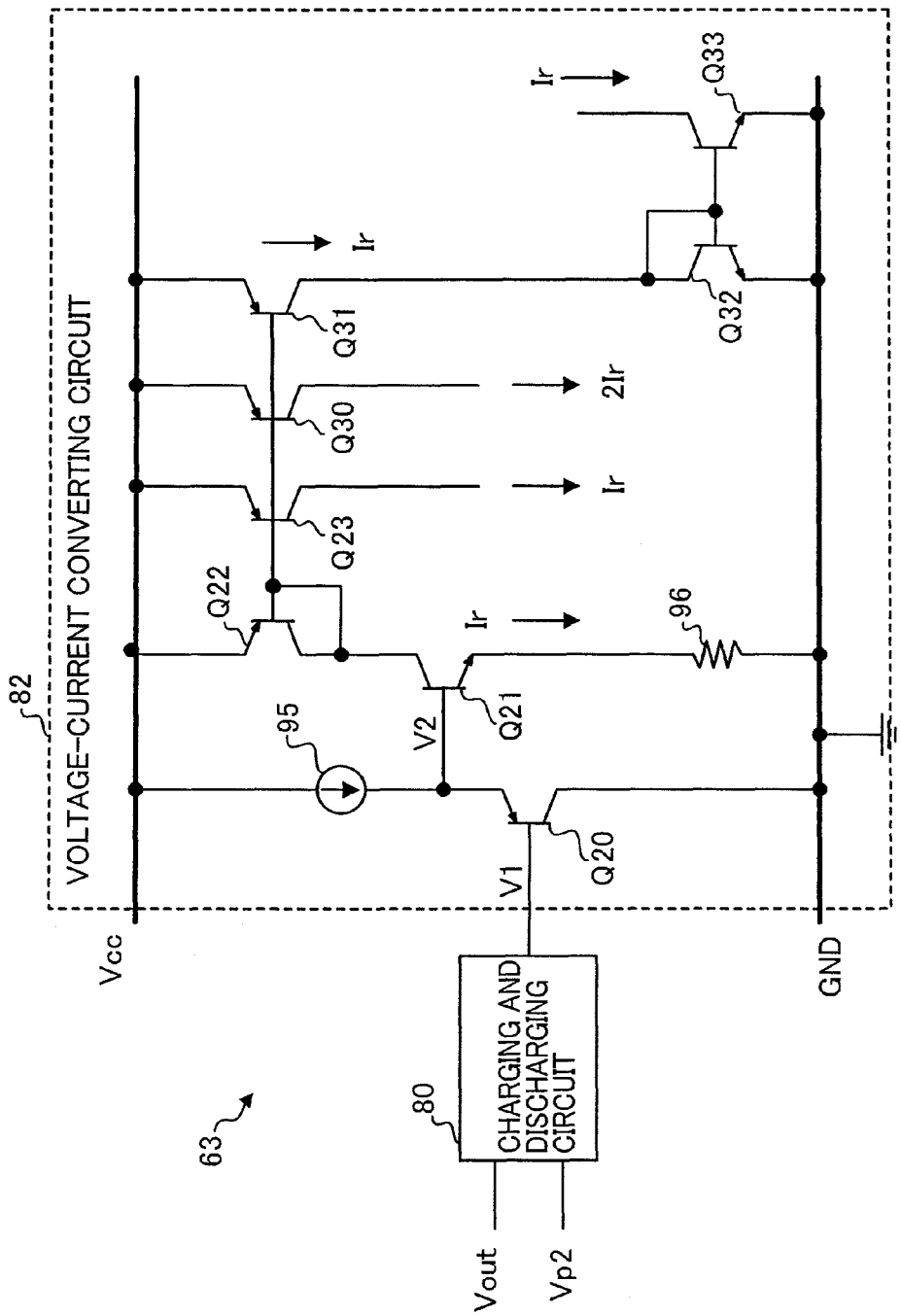
FIG. 8 is a diagram illustrating a configuration of a current generating circuit 63.

FIG. 8 depicts details of the current generating circuit 63. The current generating circuit 63 includes the charging and discharging circuit 80 and a voltage-current converting circuit 82. In FIGS. 8 and 3, since the blocks designated by the same reference numerals are equivalent, a description will be given of PNP transistors Q30 and Q31 and NPN transistors Q32 and Q33.

The PNP transistors Q30 and Q31, together with the PNP transistor Q22, make up a current mirror circuit. It is designed, however, such that the current (2Ir) of twice the current Ir flows through the PNP transistor Q30 and the current Ir flows through the PNP transistor Q31. Thus, the PNP transistor Q30 is configured to generate the current 2Ir, which is the source current. The diode-connected NPN transistor Q32 and the NPN transistor Q33 make up such a current mirror circuit that the same current flows through these NPN transistors. Thus, the NPN transistor Q33 is configured to generate the current Ir, which is the sink current.

As illustrated in FIG. 7, the current 2Ir is supplied to the node at which the level shift circuit 52 and the resistor 54 are connected, and the current Ir, which is the sink current, flows through the node at which the resistor 54 and the inverting input terminal of the comparator 55 are connected.

Thus, the voltage VD is given by $$VD = VB - Ir \times R = Vfb + Vbe2 - Ir \times R \qquad (3)$$

where the resistance value of the resistor 54 is given as R.

The current generating circuit 63 supplies the current Ir to the node at which the level shift circuit 51 and the resistor 53 are connected so that the voltage Vbe1 is equal to the voltage Vbe2, namely, so that the offset of the comparator 55 is cancelled.

Thus, the voltage VC is given by $$VC = VA = Vref + Vbe1 = Vref + Vbe2 \qquad (4)$$

Incidentally, as described above, the current Ir increases in proportion to the level of the output voltage Vout, every time the pulse signal Vp2 goes low from high. Therefore, the voltage VD decreases with the slope proportional to the level of the output voltage Vout, every time the pulse signal Vp2 goes low from high.

==Operation of Ripple Converter 10b==

Figure 9:
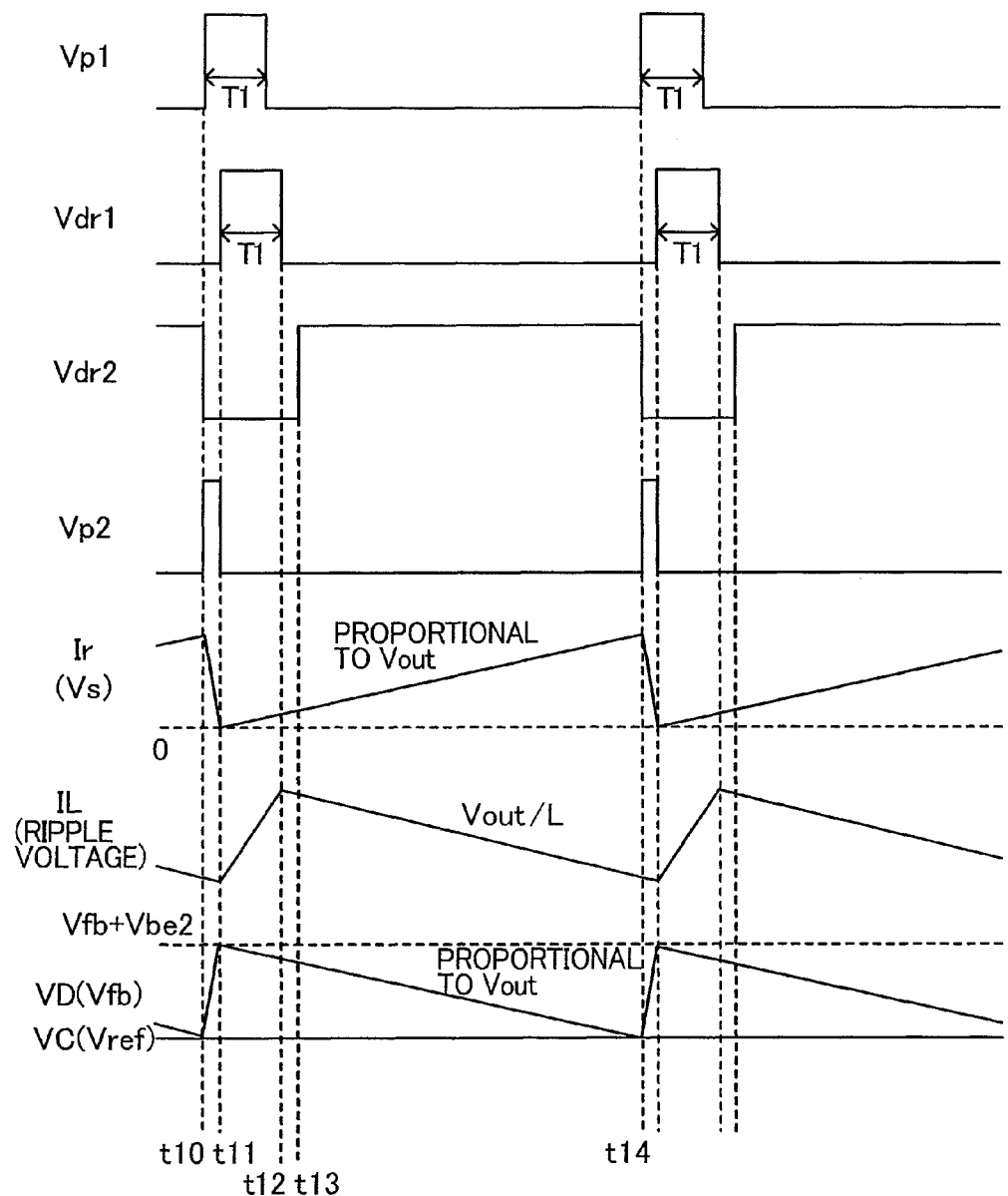
FIG. 9 is a diagram illustrating a major waveform of a ripple converter 10b.

The operation of the ripple converter 10b will be described with reference to FIGS. 7 and 9. Here, since the reference voltage Vref and the voltage Vbe1 are constant in level, the voltage VC is also constant in level.

At time t10, when the voltage VD decreases to the level of the voltage VC, the comparison voltage Vcp goes high, and therefore, the high pulse signal Vp1 is output. Thus, the drive signal Vdr2 goes low so as to turn off the NMOS transistor 31, and the pulse signal Vp2 goes high. As a result, the current Ir generated by the current generating circuit 63 reaches zero and the voltage VD increases to VD=Vfb+Vbe2.

At time t11 when the dead-time has elapsed from time t10, the drive signal Vdr1 goes high so as to turn on the NMOS transistor 30. As a result, the pulse signal Vp2 goes low, and thus the current Ir increases with the slope proportional to the level of the output voltage Vout. Consequently, the voltage VD decreases with the slope proportional to the level of the output voltage Vout.

At time t12 when the predetermined time T1 has elapsed from time t11, the drive signal Vdr1 goes low so as to turn off the NMOS transistor 30. At time t13 when the dead-time has elapsed from time t12, the drive signal Vdr2 goes high so as to turn on the NMOS transistor 31.

Thereafter, at time t14, when the voltage VD decreases to the level of the voltage VC, the operation at time t10 is repeated.

Incidentally, the slope (proportional to Vout) of the voltage VD during the time period during which the NMOS transistor 30 is off (e.g., time t12 to time t14) is similar to the slope (proportional to Vout/L) of the ripple voltage during the time period during which the NMOS transistor 30 is off. Thus, the ripple converter 10b operates in a stable manner, similarly to common ripple converters in which the ripple voltage is added to the feedback voltage Vfb, for example, during the time period during which the NMOS transistor 30 is off.

In order to stabilize the operation of the ripple converter 10b, it is only required that the slope (proportional to Vout) of the voltage VD during the time period during which the NMOS transistor 30 is off is similar to the slope (proportional to Vout/L) of the ripple voltage. Thus, the voltage VD may start to decrease at time t12, using the pulse signal generating circuit 62 in place of the pulse signal generating circuit 60, for example.

Third Embodiment

Figure 10:
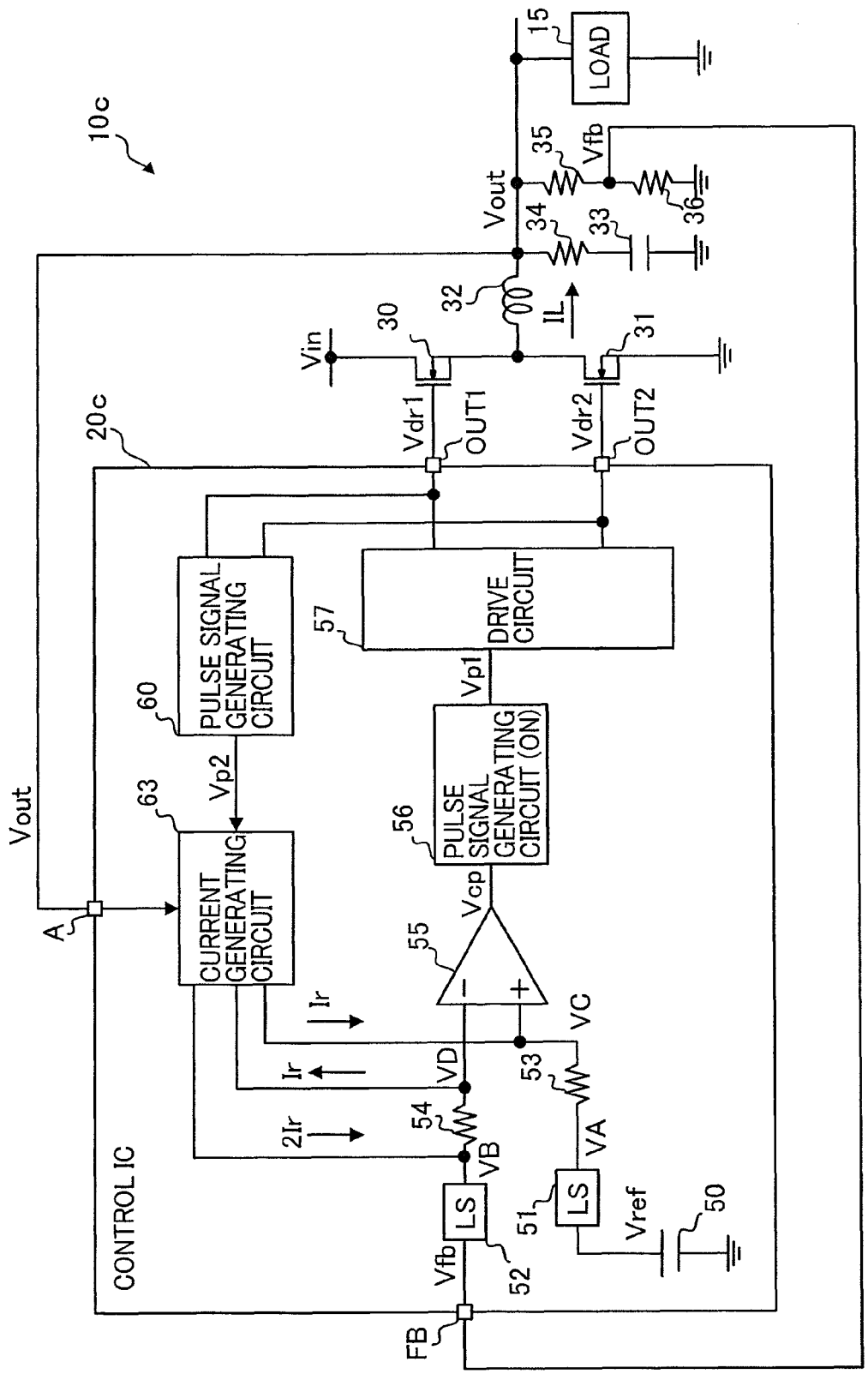
FIG. 10 is a diagram illustrating a configuration of a ripple converter 10c according to a third embodiment of the present invention.

FIG. 10 depicts a configuration of a ripple converter 10c of the fixed-on-time system according to a third embodiment of the present invention.

In the ripple converter 10c, in order to operate the ripple converter 10c in a stable manner, the slope voltage Vs, which changes with the slope corresponding to the level of the output voltage Vout, is added to both of the reference voltage Vref and the feedback voltage Vfb. When comparing a control IC 20c of FIG. 10 with the control IC 20b of FIG. 7, the two control ICs are the same except that the current Ir is supplied from the current generating circuit 63 to the node at which the resistor 53 and the non-inverting input terminal of the comparator 55 are connected. A configuration in which the current Ir is supplied to the node at which the resistor 53 and the non-inverting input terminal of the comparator 55 are connected is similar to the configuration illustrated in FIG. 1.

Thus, the voltage VC is expressed by the equation (1) and the voltage VD is expressed by the equation (3).

$$VC=VA+Ir\times R=Vref+Vbe1+Ir\times R \qquad (1)$$

$$VD=VB-Ir\times R=Vfb+Vbe2-Ir\times R \qquad (3)$$

Figure 11:
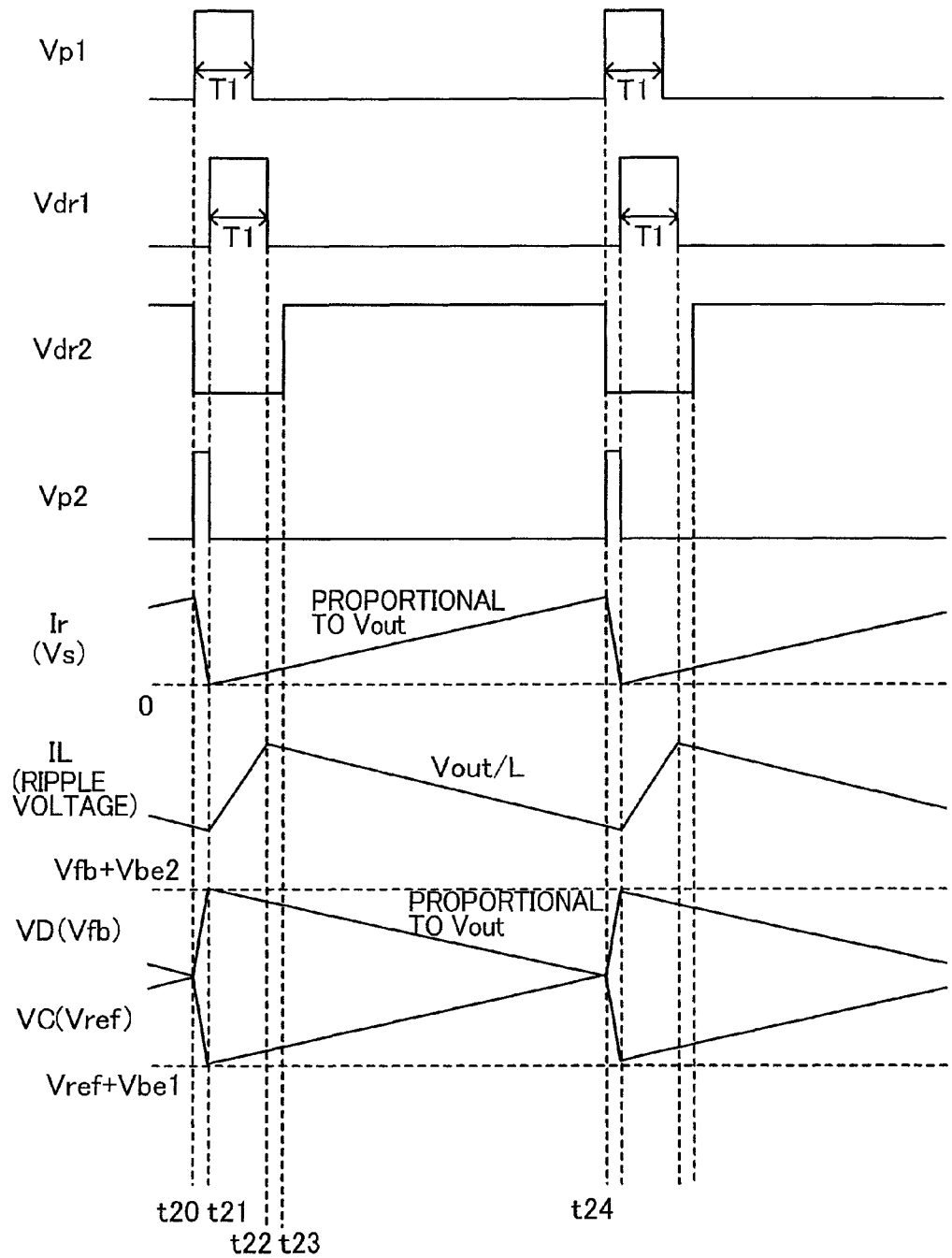
FIG. 11 is a diagram illustrating a major waveform of a ripple converter 10c.

That is to say, every time the pulse signal Vp2 goes low from high, the voltage VC increases with the slope proportional to the level of the output voltage Vout, and the voltage VD decreases with the slope proportional to the level of the output voltage Vout. Therefore, as illustrated in FIG. 11, the ripple converter 10c operates similarly to the ripple converters 10a and 10b illustrated in FIGS. 5 and 9, respectively. In FIG. 11, the slope (proportional to Vout) of the voltages VC and VD during the time period during which the NMOS transistor 30 is off is similar to the slope (proportional to Vout/L) of the ripple voltage. Thus, the ripple converter 10c, similarly to the ripple converter 10a, etc., operates in a stable manner.

The voltage Ir×R in the equation (1) corresponds to a first slope voltage, and the voltage (−Ir)×R in the equation (3) corresponds to a second slope voltage. The current generating circuit 63 and the resistor 53 correspond to a first voltage generating circuit and the current generating circuit 63 and the resistor 54 correspond to a second voltage generating circuit. Further, the level shift circuit 51 and the resistor 53 correspond to a first adding circuit and the level shift circuit 52 and the resistor 54 correspond to a second adding circuit.

Fourth Embodiment

Figure 12:
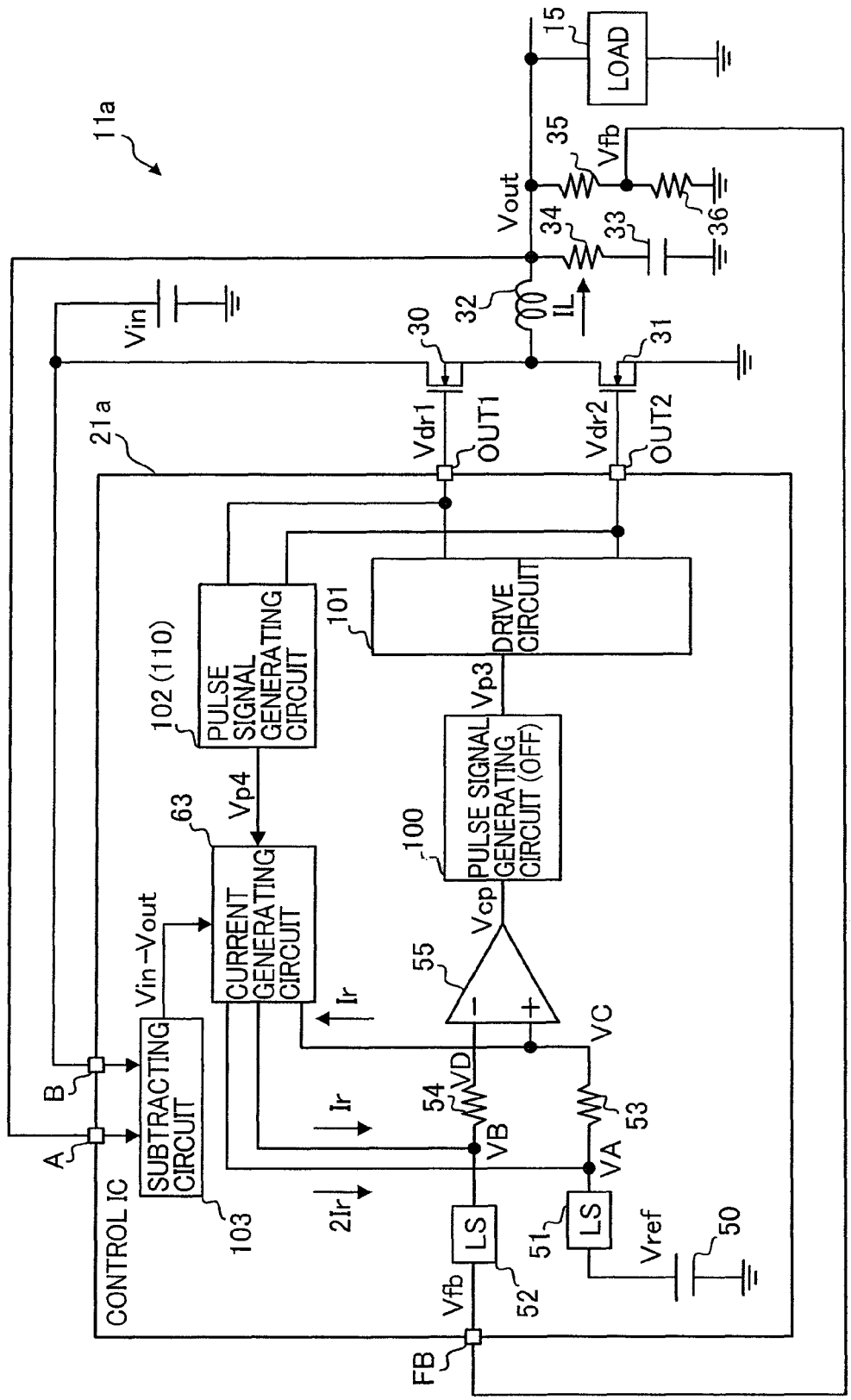
FIG. 12 is a diagram illustrating a configuration of a ripple converter 11a according to a fourth embodiment of the present invention.

FIG. 12 depicts a configuration of a ripple converter 11a of a fixed-off-time system according to a fourth embodiment of the present invention. In the ripple converter 11a, In order to operate the ripple converter 11a in a stable manner, the slope voltage Vs which changes with the slope corresponding to the level of a difference between the input voltage Vin and the output voltage Vout is added to the reference voltage Vref.

When comparing the configurations between FIG. 12 and FIG. 1, for example, the configurations are identical in blocks included in a control IC, except for pulse signal generating circuits 100 and 102, a drive circuit 101, and a subtracting circuit 103 among blocks included in a control IC 21a. Thus, the blocks that are different from those in FIG. 1 will be described.

The pulse signal generating circuit 100 is a so-called one-shot circuit, and is configured to generate a pulse signal Vp3 which goes low and is kept low for a predetermined time T2 when the comparison voltage Vcp goes low.

When the pulse signal Vp3 goes low, the drive circuit 101 turns off the NMOS transistor 30, and thereafter turns on the NMOS transistor 31. The drive circuit 101 turns off the NMOS transistor 31 immediately before the predetermined time T2 has elapsed from a time when the pulse signal Vp3 goes low (at timing when a time period shorter than the predetermined time T2 by the dead-time has been elapsed). Further, the drive circuit 101 turns on the NMOS transistor 30 when the predetermined time T2 has elapsed from a time when the pulse signal Vp3 goes low.

As such, the drive circuit 101 performs switching of the NMOS transistors 30 and 31 in a complementary manner by providing the dead-time so that both of the NMOS transistors 30 and 31 are not on at the same time.

The pulse signal generating circuit 102 is configured to generate a pulse signal Vp4 which goes high in each of the switching period, for example, in every dead-time period immediately before the NMOS transistor 31 is turning on.

The subtracting circuit 103 calculates a difference between the input voltage Vin which is input via a terminal B and the output voltage Vout which is input via the terminal A, and outputs a voltage difference Vin−Vout to the current generating circuit 63 as a result of the calculation.

Thus, the current generating circuit 63 is configured to generate the source current (currents Ir and 2Ir) and the sink current (current Ir) that change with the slope corresponding to the level of the voltage difference Vin−Vout, every time the pulse signal Vp4 goes low from high. Therefore, the voltage VC is given by $$VC=VA-Ir\times R=Vref+Vbe1-Ir\times R \qquad (5)$$

And the voltage VD is given by $$VD=VB=Vfb+Vbe2 \qquad (6)$$

==Operation of Ripple Converter 11a==

Figure 13:
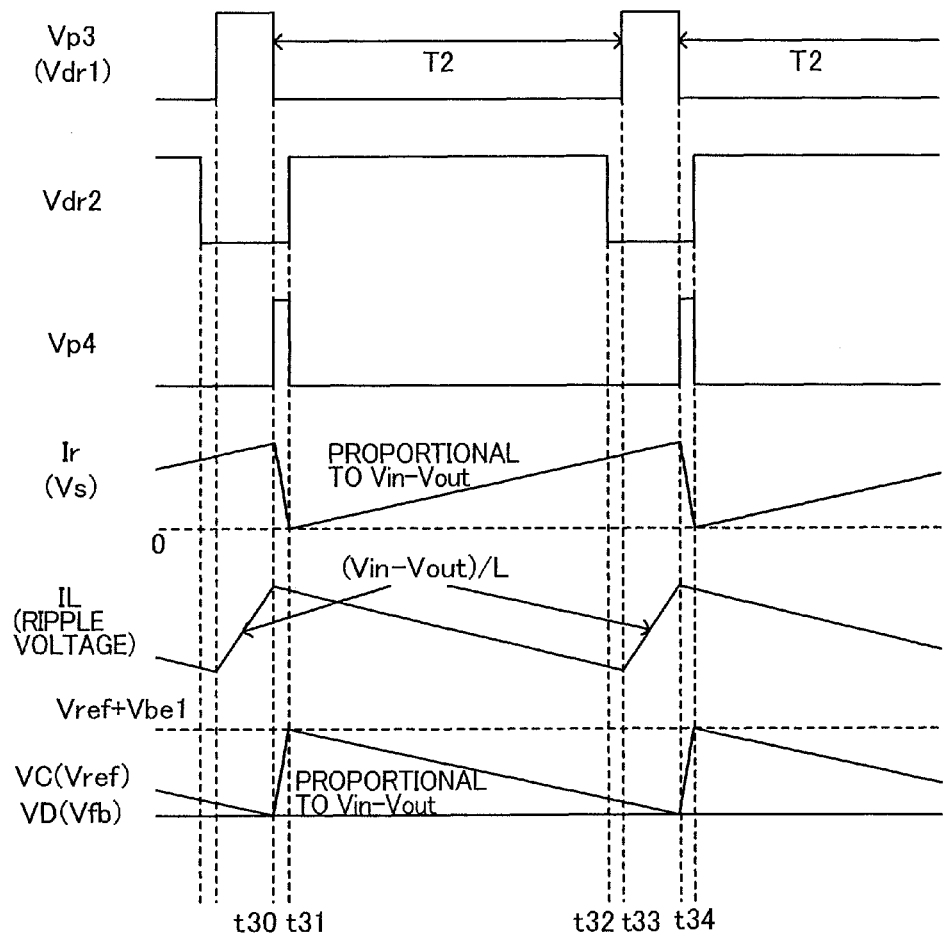

The operation of the ripple converter 11a will be described with reference to FIG. 13. As described above, in an embodiment of the present invention, since the ripple voltage contained in the output voltage Vout is sufficiently small, the feedback voltage Vfb, namely, the voltage VD is almost constant in level.

At time t30, when the voltage VC decreases to the level of the voltage VD, the comparison voltage Vcp goes low, and thus the low pulse signal Vp3 is output. Therefore, the drive signal Vdr1 also goes low, and the pulse signal Vp4 goes high. As a result, the current Ir supplied by the current generating circuit 63 reaches zero, and the voltage VC increases up to VC=Vref+Vbe1.

At time t31 when the dead-time has elapsed from time t30, the drive signal Vdr2 goes high so as to turn on the NMOS transistor 31. As a result, the pulse signal Vp4 goes low, and therefore, the current Ir increases with the slope proportional to the level of the voltage difference Vin−Vout. On the other hand, the voltage VC decreases with the slope proportional to the level of the voltage difference Vin−Vout, in accordance with the increase in the current Ir.

At time 32 immediately before the predetermined time T2 has elapsed from time t30, the drive signal Vdr2 goes low so as to turn off the NMOS transistor 31. At time t33 when the predetermined time T2 has elapsed from time t30, the drive signal Vdr1 goes high so as to turn on the NMOS transistor 30.

Thereafter, at time t34, when the voltage VC decreases to the level of the voltage VD, the operation of time t30 is repeated.

Incidentally, Vin−Vout is the voltage across the inductor 32 when the NMOS transistor 30 is on and the NMOS transistor 31 is off. Thus, during the time period during which the NMOS transistor 30 is on, the inductor current IL increases with the slope proportional to the level of the voltage difference Vin−Vout and inversely proportional to the inductance L of the inductor 32. Since the inductance L is of a predetermined value, the inductor current IL during the time period during which the NMOS transistor 30 is on is substantially proportional to the level of the voltage difference Vin−Vout.

Incidentally, the slope (proportional to Vin−Vout) of the voltage VC during the time period during which the NMOS transistor 30 is on is similar to the slope (proportional to (Vin−Vout)/L) of the ripple voltage during the time during which the NMOS transistor 30 is on.

In the ripple converter 11a, while the ripple voltage, etc., are not added to the reference voltage Vref, the voltage (−Ir×R) of such a slope that the voltage changes in a similar manner to the ripple voltage ((Vin−Vout)/L) is added to the reference voltage Vref during the time period during which the NMOS transistor 30 is on. That is to say, in an embodiment of the present invention, in order to detect the timing of turning off the NMOS transistor 30, the voltage VC is changed with the slope similar to the slope of the ripple voltage during the time period during which the NMOS transistor 30 is on (e.g., time t33 to time t34).

Consequently, the ripple converter 11a, similarly to a common ripple converter in which the ripple voltage is added to the reference voltage Vref, for example, operates in a stable manner.

==Timing of Change in Voltage VC==

In the ripple converter 11a, it is assumed that is designed to start to decrease the voltage VC increases at the timing of time t31. In order to stabilize the operation of the ripple converter 11a, it is only required that the slope (proportional to Vin−Vout) of the voltage VC during the time period during which the NMOS transistor 30 is similar to the slope (proportional to (Vin−Vout)/L) of the ripple voltage.

Thus, as illustrated in FIG. 12, for example, a pulse signal generating circuit 110 may be used in place of the pulse signal generating circuit 102.

Figure 14:
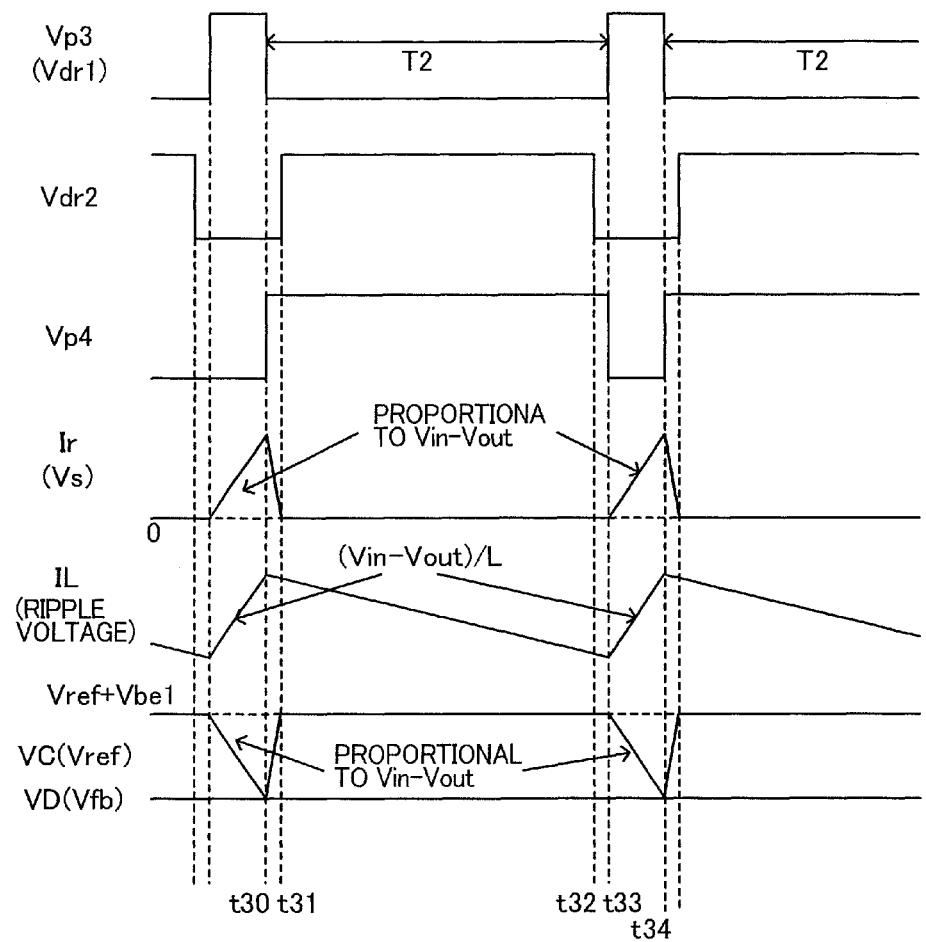

As illustrated in FIG. 14, for example, the pulse signal generating circuit 110 outputs the high pulse signal Vp4 during the time period during which the drive signal Vdr1 is low. In such a case, the voltage VC starts to decrease at time t33, and the slope of the voltage VC during the time period during which the NMOS transistor 30 is on is similar to the slope of the ripple voltage.

Therefore, even in such a case, the ripple converter 11a operates in a stable manner.

Fifth Embodiment

Figure 15:
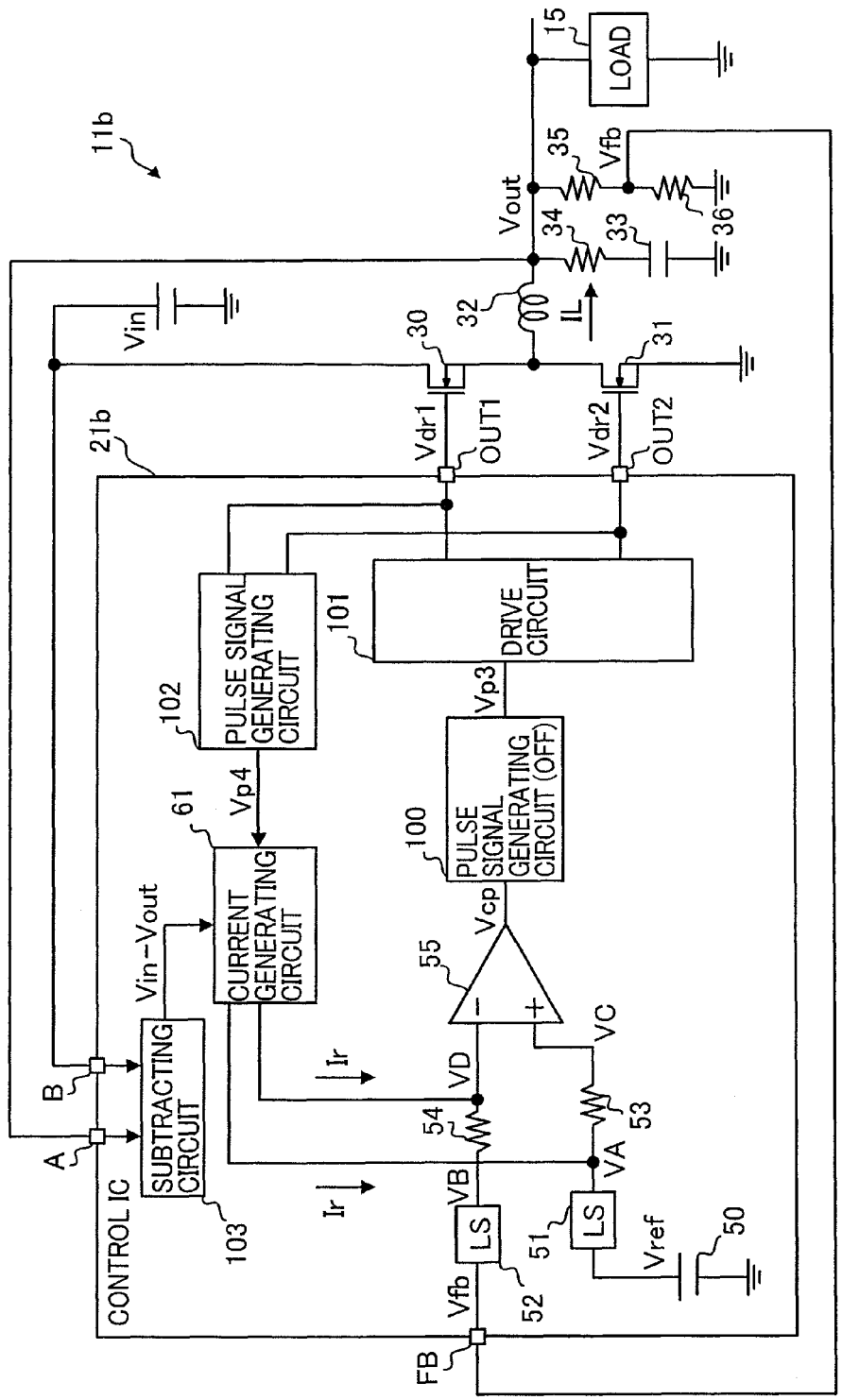
FIG. 15 is a diagram illustrating a configuration of a ripple converter 11b according to a fifth embodiment of the present invention.

FIG. 15 depicts a configuration of a ripple converter 11b of the fixed-off-time system according to a fifth embodiment of the present invention.

In the ripple converter 11b, in order to operate the ripple converter 11b in a stable manner, the slope voltage Vs which changes with the slope corresponding to the level of the voltage difference Vin−Vout is added to the feedback voltage Vfb. When comparing the configurations between FIG. 15, for example, the configurations are identical in blocks included in a control IC, except for the current generating circuit 61 among the blocks included in a control IC 21b.

The current Ir from the current generating circuit 61 is supplied to the node at which the level shift circuit 51 and the resistor 53 are connected and to the node at which the resistor 54 and the inverting input terminal of the comparator 55 are connected.

Thus, the voltage VC is given by $$VC = VA = Vref + Vbe1 \quad (7)$$

and the voltage VD is given by $$VD = VB + Ir \times R = Vfb + Vbe2 + Ir \times R \quad (8)$$

Therefore, when the pulse signal Vp4 goes low from high, the voltage VD changes with the slope corresponding to the level of the voltage difference Vin−Vout.

==Operation of Ripple Converter 11b==

Figure 16:
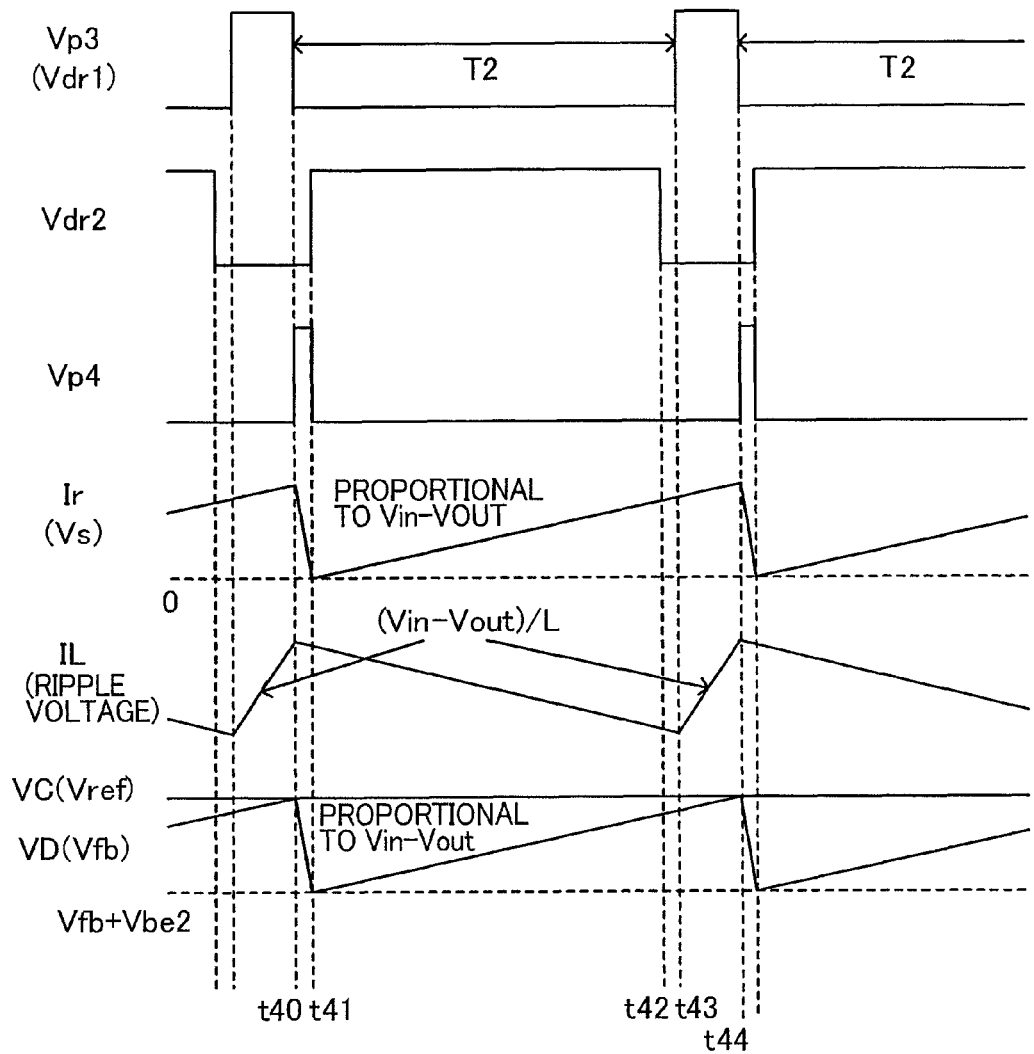
FIG. 16 is a diagram illustrating a major waveform of a ripple converter 11b.

The operation of the ripple converter 11b will be described with reference to FIG. 16. Since the reference voltage Vref and the voltage Vbe1 are constant in level, the voltage VC also is constant in level.

At time t40, when the voltage VD increases to the level of the voltage VC, the comparison voltage Vcp goes low, and therefore the low pulse signal Vp3 is output. Thus, the drive signal Vdr1 also goes low, and the pulse signal Vp4 goes high. As a result, the current Ir supplied by the current generating circuit 61 reaches zero, and the voltage VD decreases to VD=Vfb+Vbe2.

At time t41 when the dead-time has been elapsed from time t40, the drive signal Vdr2 goes high so as to turn on the NMOS transistor 31. As a result, the pulse signal Vp4 goes low, and therefore, the current Ir increases with the slope proportional to the level of the voltage difference Vin−Vout. The voltage VD also increases with the slope proportional to the level of the voltage difference Vin−Vout in accordance with the increase in the current Ir.

At time t42 immediately before the predetermined time T2 has elapsed from time t40, the drive signal Vdr2 goes low so as to turn off the NMOS transistor 31. At time t43 when the predetermined time T2 has elapsed from time t40, the drive signal Vdr1 goes high so as to turn on the NMOS transistor 30.

Thereafter, at time t44, when the voltage VD increases to the level of the voltage VC, the operation at time t40 is repeated.

In an embodiment of the present invention, the slope (proportional to Vin−Vout) of the voltage VD during the time period (e.g., time t43 to time t44) during which the NMOS transistor 30 is on is similar to the slope (proportional to (Vin−Vout)/L) of the ripple voltage during the time period during which the NMOS transistor 30 is on. Therefore, the ripple converter 11b, similarly to a common ripple converter in which the ripple voltage is added to the feedback voltage Vfb, for example, operates in a stable manner during the time period during which the NMOS transistor 30 is on.

In order to stabilize the operation of the ripple converter 11b, it is only required that the slope of the voltage VD during the time during which the NMOS transistor 30 is on is similar to the slope of the ripple voltage. Thus, the voltage VD may start to increase at time t43, using the pulse signal generating circuit 110 in place of the pulse signal generating circuit 102, for example.

Sixth Embodiment

Figure 17:
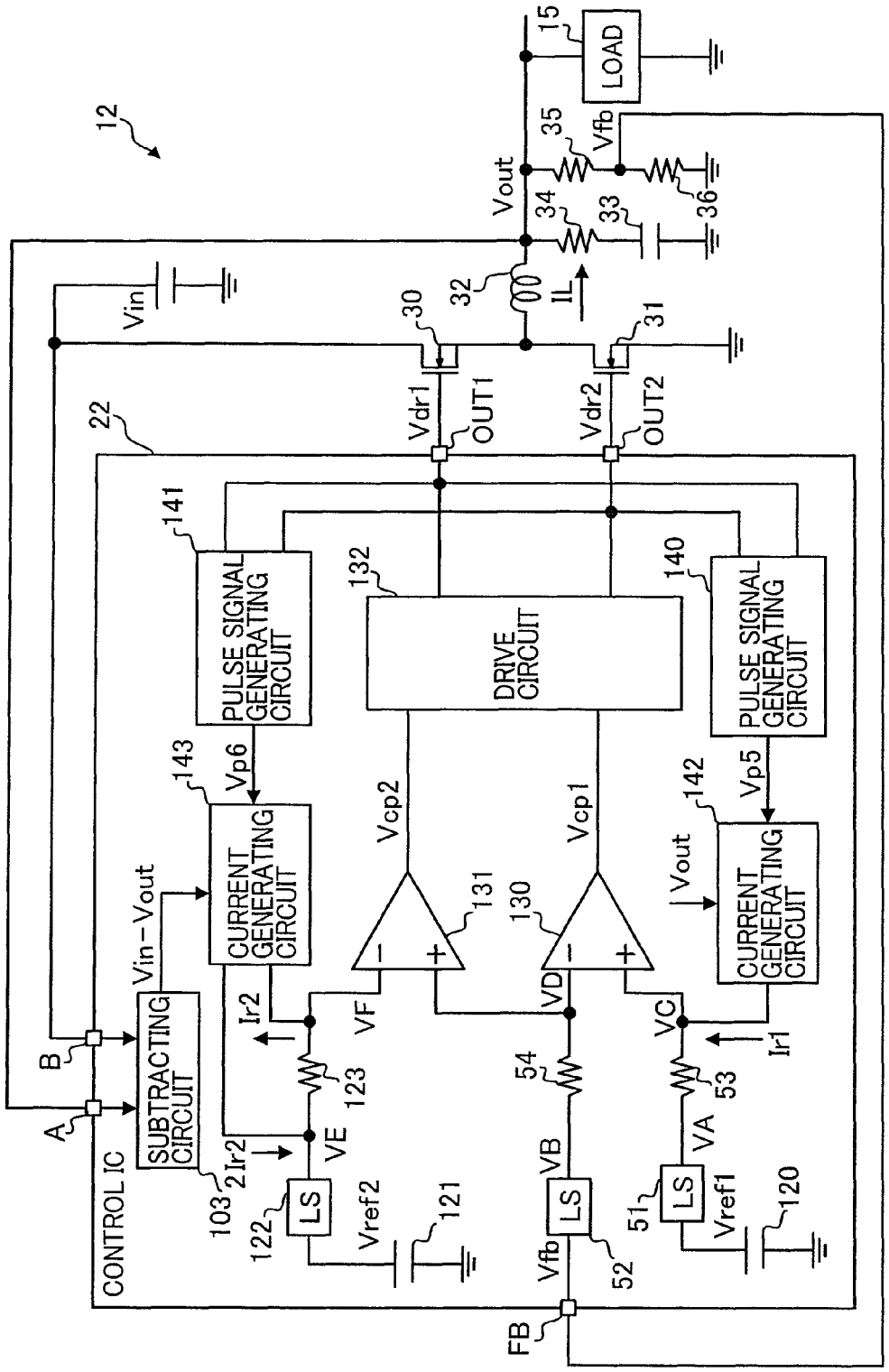
FIG. 17 is a diagram illustrating a configuration of a ripple converter 12 according to a sixth embodiment of the present invention.

FIG. 17 depicts a configuration of a ripple converter 12 of a hysteresis window system according to a sixth embodiment of the present invention. The ripple converter 12 performs switching of the NMOS transistors 30 and 31 so that the feedback voltage Vfb changes between a reference voltage Vref1 and a reference voltage Vref2(>Vref1). In the ripple converter 12, in order to operate the ripple converter 12 in a stable manner, a slope voltage Vs1, which changes with the slope corresponding to the level of the output voltage Vout, is added to the reference voltage Vref1. Further, in the ripple converter 12, a slope voltage Vs2, which changes with the slope corresponding to the level of the difference between the input voltage Vin and the output voltage Vout is added to the reference voltage Vref2.

A control IC 22 of the ripple converter 12 includes reference voltage generating circuits 120 and 121, the level shift circuits 51, 52, and 122, the resistors 53, 54, and 123, comparators 130 and 131, a drive circuit 132, pulse signal generating circuits 140 and 141, current generating circuits 142 and 143, the subtracting circuit 103, and the terminals A, B, FB, OUT1, and OUT2. In FIG. 17, blocks equivalent to those in FIG. 1 are designated by the same reference numerals, for example. Thus, the reference voltage generating circuit 120, etc., will hereinafter be described.

The reference voltage generating circuit 120 is configured to generate a predetermined reference voltage Vref1 (first reference voltage), and the reference voltage generating circuit 121 is configured to generate a predetermined reference voltage Vref2(>Vref1) higher than the reference voltage Vref1.

The level shift circuit 122 is configured to output, to one end of the resistor 123, a voltage VE obtained by shifting the level of the reference voltage Vref2 (second reference voltage). Since the level shift circuit 122 is similar in configuration to the level shift circuit 51, for example, the voltage VE is given by VE=Vref2+Vbe. The Vbe is the base-emitter voltage of the PNP transistor (not shown) included inside the level shift circuit 122. Here, the voltage of the other end of the resistor 123 is referred to as a voltage VF.

The comparator 130 is configured to compare the voltage VC and the voltage VD, and outputs a comparison voltage Vcp1 indicative of a result of the comparison. The comparator 131 is configured to compare the voltage VD and the voltage VF, and outputs a comparison voltage Vcp2 indicative of a result of the comparison.

When the comparison voltage Vcp1 goes high, the drive circuit 132 turns off the NMOS transistor 31, and thereafter turns on the NMOS transistor 30. When the comparison voltage Vcp2 goes high, the drive circuit 132 turns off the NMOS transistor 30, and thereafter turns on the NMOS transistor 31. Thus, the drive circuit 132 performs switching of the NMOS transistors 30 and 31 in a complementary manner by providing the dead-time so that both of the NMOS transistors 30 and 31 are not on at the same time.

The pulse signal generating circuit 140 is configured to generate a pulse signal Vp5 which goes high in each of the switching period, for example, in every dead-time period immediately before the NMOS transistor 30 is turning on.

The pulse signal generating circuit 141 is configured to generate a pulse signal Vp6 which goes high in each of the switching period, for example, in every dead-time period immediately before the NMOS transistor 31 is turned on.

The current generating circuit 142 is configured to generate a current In that changes with the slope corresponding to the level of the output voltage Vout, every time the pulse signal Vp5 goes low from high. The current In from the current generating circuit 142 is supplied to the resistor 53.

Thus, the voltage VC is given by $$VC=VA+Ir \times R=Vref1+Vbe1+Ir1 \times R \qquad (9).$$

The current generating circuit 142 and the resistor 53 correspond to a first voltage generating circuit and the current generating circuit 142 is similar to the current generating circuit 61, for example.

The current generating circuit 143 is configured to generate the source current (current 2Ir2)) and the sink current (current Ir2) that change with the slope corresponding to the level of the voltage difference Vin−Vout, every time the pulse signal Vp6 goes low from high. The source current and the sink current are supplied to the resistor 123 so that the voltage VF is lower than the voltage VE.

The voltage VF is given by $$VF=VE-Ir \times R=Vref2+Vbe-Ir2 \times R \qquad (10)$$

where the resistance value of the resistor 123 is R. The current generating circuit 143 and the resistor 123 correspond to a second voltage generating circuit, and the current generating circuit 143 is similar to the current generating circuit 63, for example.

The level shift circuit 51 and the resistor 53 correspond to a first adding circuit, and the level shift circuit 122 and the resistor 123 correspond to a second adding circuit.

==Operation of Ripple Converter 12==

Figure 18:
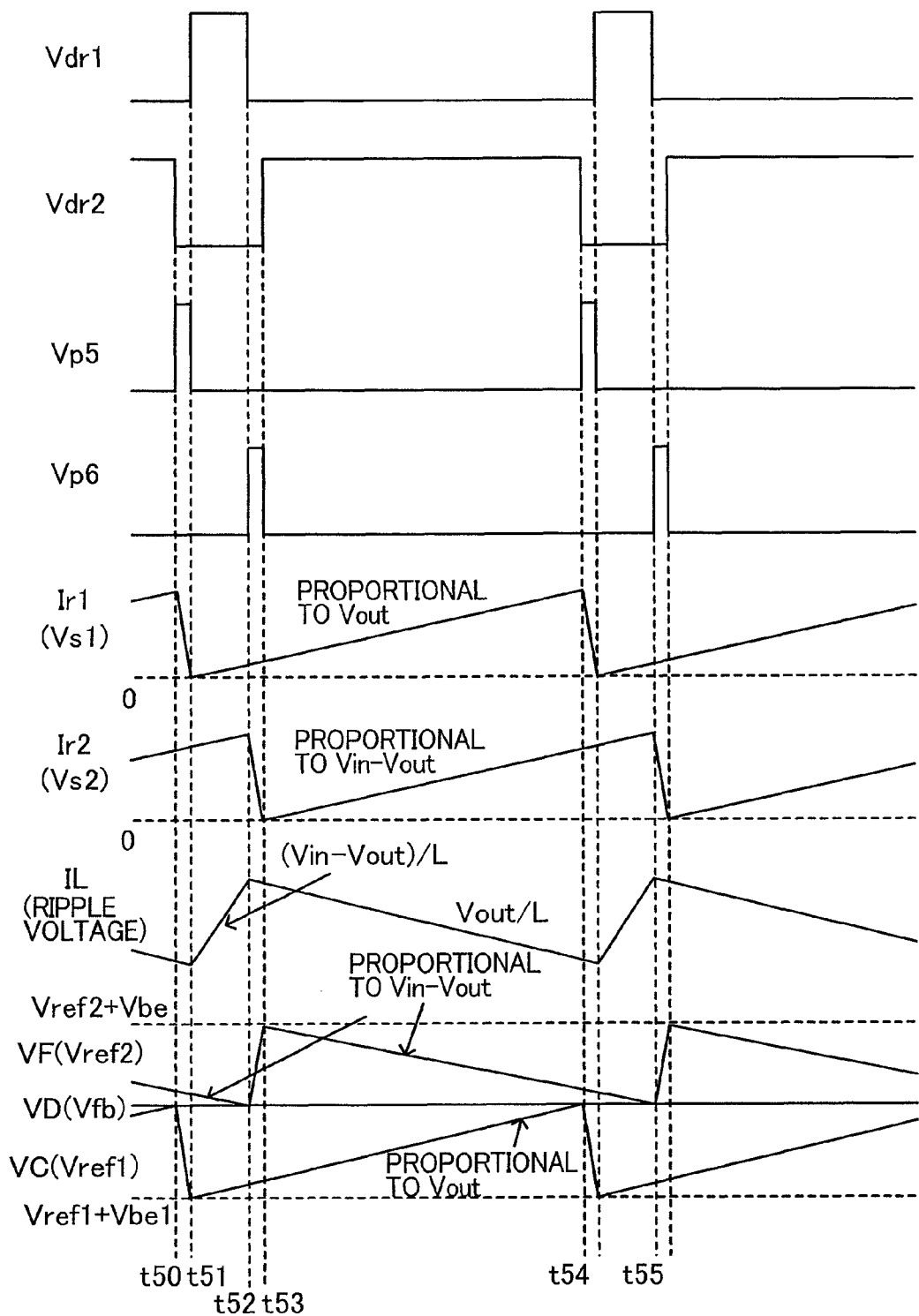
FIG. 18 is a diagram illustrating a major waveform of a ripple converter 12.

The operation of the ripple converter 12 will now be described with reference to FIG. 18. Since the ripple voltage contained in the output voltage Vout is sufficiently small, the feedback voltage Vfb and the voltage VD are almost constant in level.

At time t50, when the voltage VC increases to the level of the voltage VD, the comparison voltage Vcp1 goes high, and therefore, the drive signal Vdr2 goes low so as to turn off the NMOS transistor 31. When the drive signal Vdr2 goes low, the pulse signal Vp5 goes high, and therefore, the current In reaches zero and the voltage VC decreases to VC=Vref1+Vbe1.

At time t51 when the dead-time has elapsed from time t50, the drive signal Vdr1 goes high so as to turn on the NMOS transistor 30. As a result, the pulse signal Vp5 goes low, and therefore, the current In increases with the slope proportional to the level of the output voltage Vout. As a result, similarly to the current Ir1, the voltage VC also increases with the slope proportional to the level of the output voltage Vout.

At time t52, when the voltage VF decreases to the level of the voltage VD, the comparison voltage Vcp2 goes high, and therefore, the drive signal Vdr1 goes low so as to turn off the NMOS transistor 30. When the drive signal Vdr1 goes low, the pulse signal Vp6 goes high, and therefore, the current Ir2 reaches zero and the voltage VF increases to VF=Vref2+Vbe.

At time t53 when the dead-time has elapsed from time t52, the drive signal Vdr2 goes high so as to turn on the NMOS transistor 31. As a result, the pulse signal Vp6 goes low, and therefore, the current Ir2 increases with the slope proportional to the level of the voltage difference Vin−Vout. As a result, the voltage VF decreases with the slope proportional to the level of the voltage difference Vin−Vout.

Thereafter, at time t54, when the voltage VC increases to the level of the voltage VD, the operation at time t50 is repeated; and at time t55, when the voltage VF decreases to the level of the voltage VD, the operation of time t52 is repeated.

Incidentally, the slope (proportional to Vout) of the voltage VC during the time period (e.g., time t53 to time t54) during which the NMOS transistor 31 is on is similar to the slope (proportional to Vout/L) of the ripple voltage during the time period during which the NMOS transistor 31 is on. The slope (proportional to Vin−Vout) of the voltage VF during the time period (e.g., time t51 to time t52) during which the NMOS transistor 30 is on is similar to the slope (proportional to (Vin−Vout)/L) of the ripple voltage during the time during which the NMOS transistor 30 is on.

That is to say, in an embodiment of the present invention, while the ripple voltage is not added to the reference voltages Vref1 and Vref2, the slope voltage Vs of such a slope that the voltage changes in a similar manner to the ripple voltage is added to each of the reference voltages Vref1 and Vref2. Therefore, the ripple converter 12 operates in a stable manner without using an external component to detect the inductor current IL, etc.

==Timing of Change in Voltages VC and VF==

In order to stabilize the operation of the ripple converter 12, it is only required that each of the slope of the voltage VC during the time period during which the NMOS transistor 31 is on and the slope of the voltage VF during the time period during which the NMOS transistor 30 is on is similar to the slope of the ripple voltage.

Figure 19:
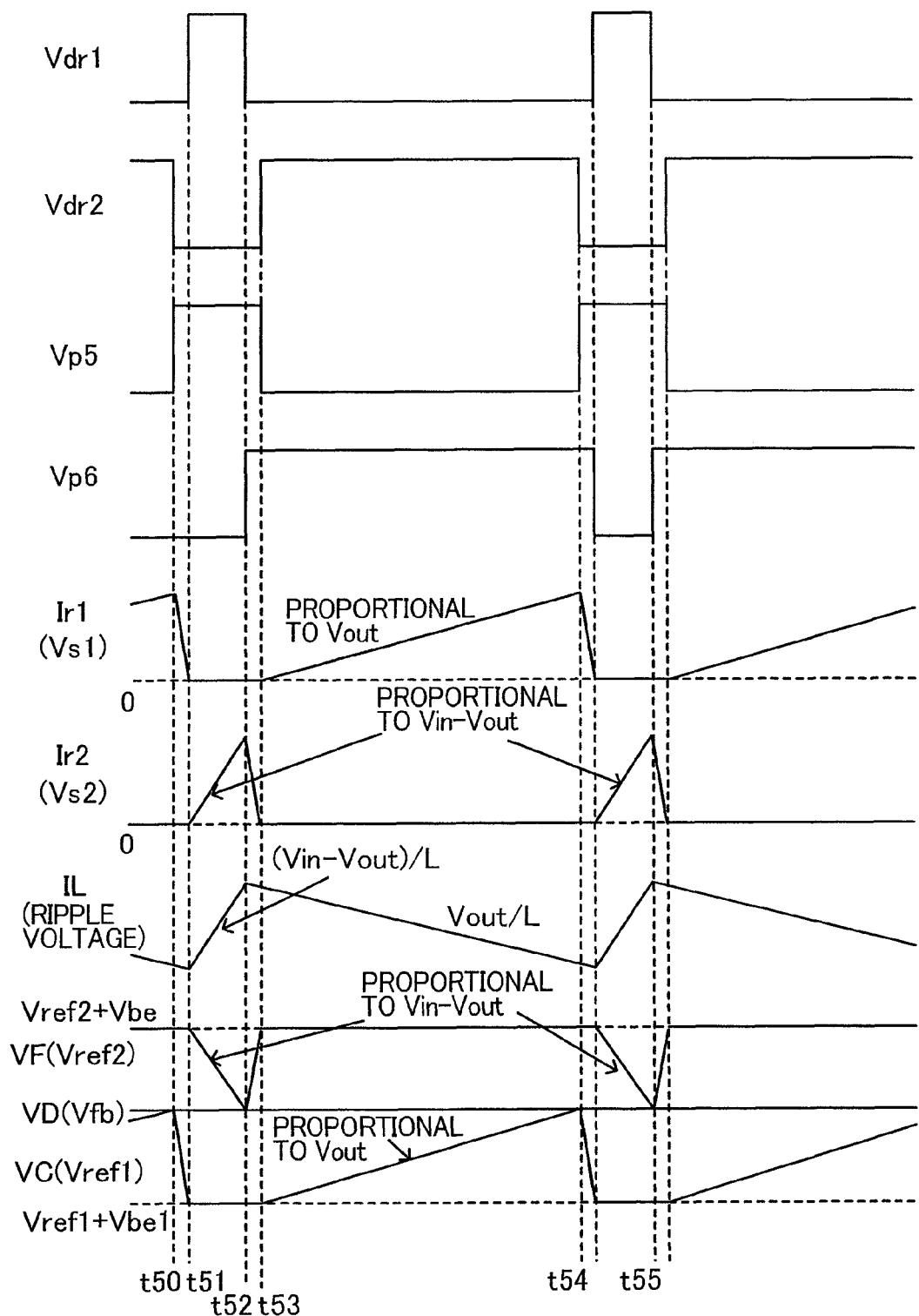
FIG. 19 is a diagram illustrating a major waveform of a ripple converter 12.
Figure 20:
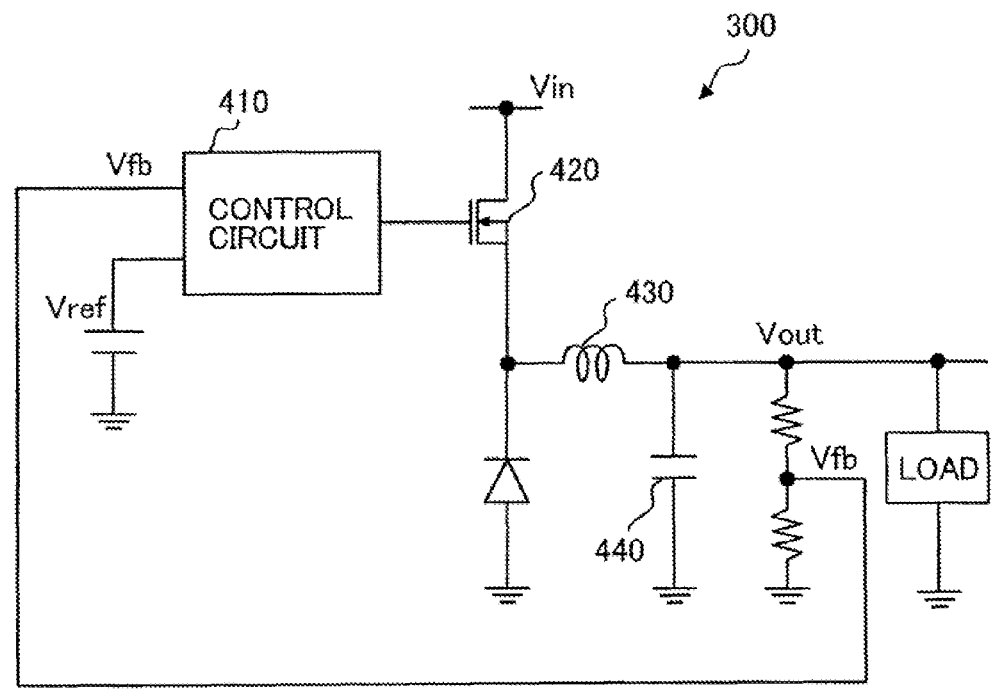
FIG. 20 is a diagram illustrating a common ripple converter 300.

Therefore, for example, as illustrated in FIG. 19, the pulse signal generating circuit 140 may be caused to output the high pulse signal Vp5 during the time period during which the drive signal Vdr2 is low, and the pulse signal generating circuit 141 may be caused to output the high pulse signal Vp6 during the time period during which the drive signal Vdr1 is low.

In such a case, the slope (proportional to Vout) of the voltage VC during the time period (e.g., time t53 to time t54) during which the NMOS transistor 31 is on is similar to the slope (proportional to Vout/L) of the ripple voltage during the time period during which the NMOS transistor 31 is on. Further, the slope (proportional to Vin−Vout) of the voltage VF during the time period (e.g., time t51 to time t52) during which the NMOS transistor 30 is on is similar to the slope (proportional to (Vin−Vout)/L) of the ripple voltage during the time period during which the NMOS transistor 30 is on. Therefore, even in such a case, the ripple converter 12 operates in a stable manner.

Hereinabove, the ripple converters 10 to 12 according to an embodiment of the present invention have been described.

The control IC 20a illustrated in FIG. 1 causes the ripple converter 10a to operate in a stable manner without using the ripple voltage, etc., on the basis of the inductor current IL, for example. Thus, the ripple converter 10a is not required to use an external component, etc., which is necessary for detecting the inductor current IL, etc., thereby being able to reduce the number of parts. In general, in the case where the ripple converter is controlled using the ripple voltage from an external component, the external component is susceptible to noise, which may result in an unstable operation of the ripple converter. Whereas, the control IC 20a, which is configured to generate the so-called slope voltage Vs (Ir×R) based on the output voltage Vout, is unsusceptible to noise.

The use of the control IC 20a, for example, enables the fixed-on-time system to be employed as a control system of the ripple converter.

The use of the control IC 21a shown in FIG. 12, for example, enables the fixed-off-time system to be employed as the control system of the ripple converter.

The slope voltage Vs may be added only to either one of the reference voltage Vref and the feedback voltage Vfb, however, the voltage VC or the voltage VD may exceed the so-called input common mode voltage range of the comparator 55 if the slope voltage Vs changes greatly. In such a case, as illustrated in FIG. 11, for example, both of the voltages VC and VD may be caused to change by adding the slope voltage Vs (Ir×R) to the reference voltage Vref and adding the slope voltage Vs (−Ir×R) to the feedback voltage Vfb. The voltages VC and VD are caused to change, which leads the voltages VC and VD to become unlikely to exceed the input common mode voltage of the comparator 55.

The use of the control IC 22 illustrated in FIG. 17, for example, enables the hysteresis window system to be employed as the control system of the ripple converter.

For example, the NMOS transistors 30 and 31 may be integrated into the control IC 20a. Even in the switching power supply circuit including such power transistors, similar effect to that in an embodiment of the present invention can be obtained.

The control IC 20a, etc., can also be employed in the power supply circuit of a diode rectification system, including a diode in place of the NMOS transistor 31, rather than in the power supply circuit of a synchronous rectification system including the NMOS transistors 30 and 31.

Even in the ripple converter of the fixed off-time system, the slope voltage Vs may be added to both of the reference voltage Vref and the feedback voltage Vfb.

While the source electrode of the NMOS transistor 31 is connected to a ground GND, a negative voltage (−Vdd) in place of the ground GND may be applied to the source electrode, for example. In such a case, if the slope voltage Vs during the time period during which the NMOS transistor 31 is on is generated according to the level of the voltage Vin−(−Vdd), the ripple converter can be controlled more accurately.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A switching control circuit configured to control a switching operation of a transistor to generate an output voltage of a target level from an input voltage, the transistor having an input electrode applied with the input voltage and an output electrode connected to a load via an inductor, the switching control circuit comprising: a voltage generating circuit configured to generate a slope voltage based on the output voltage in each of a switching period of the transistor, the slope voltage changing with a slope corresponding to the output voltage; an adding circuit configured to add the slope voltage to a reference voltage or a feedback voltage, the reference voltage indicating a reference of the output voltage of the target level, the feedback voltage corresponding to the output voltage; and a drive circuit configured to perform the switching operation of the transistor, when a level of either one voltage, added with the slope voltage, of the reference voltage and the feedback voltage reaches a level of an other voltage thereof; wherein the voltage generating circuit is configured to generate, as the slope voltage, a voltage changing with a slope corresponding to a difference between the input voltage and the output voltage, based on the input voltage and the output voltage, in each of the switching period.

2. The switching control circuit of claim 1, wherein
the drive circuit is configured to turn on the transistor for a predetermined time and thereafter turn off the transistor, when the level of the one voltage reaches the level of the other voltage.

3. A switching control circuit configured to control a switching operation of a transistor to generate an output voltage of a target level from an input voltage, the transistor having an input electrode applied with the input voltage and an output electrode connected to a load via an inductor, the switching control circuit comprising:

a first voltage generating circuit configured to generate a first slope voltage with such a slope that the first slope voltage increases with an increase in the output voltage, based on the output voltage, in each of a switching period of the transistor;

a second voltage generating circuit configured to generate a second slope voltage with such a slope that the second slope voltage decreases with an increase in the output voltage, based on the output voltage in each of the switching period;

a first adding circuit configured to add the first slope voltage to either one voltage of a reference voltage and a feedback voltage, the reference voltage indicating a reference of the output voltage of the target level, the feedback voltage corresponding to the output voltage;

a second adding circuit configured to add the second slope voltage to an other voltage of the reference voltage and the feedback voltage; and a drive circuit configured to perform the switching operation of the transistor, when a level of the one voltage reaches a level of the other voltage.

4. A switching control circuit configured to control a switching operation of a transistor to generate an output voltage of a target level from an input voltage, the transistor having an input electrode applied with the input voltage and an output electrode connected to a load via an inductor, the switching control circuit comprising:

a first voltage generating circuit configured to generate a first slope voltage based on the output voltage in each of a switching period of the transistor, the slope voltage changing with a slope corresponding to the output voltage;

a second voltage generating circuit configured to generate a second slope voltage based on the input voltage and the output voltage in each of the switching period, the second slope voltage changing with a slope corresponding to a difference between the input voltage and the output voltage;

a first adding circuit configured to add the first slope voltage to a first reference voltage, the first reference voltage indicating a reference of the output voltage of the target level;

a second adding circuit configured to add the second slope voltage to a second reference voltage, the second reference voltage indicating a reference of the output voltage of the target level, the second reference voltage being higher than the first reference voltage; and a drive circuit configured to
turn on the transistor when a level of a voltage obtained by adding the first slope voltage to the first reference voltage reaches a level of a feedback voltage corresponding to the output voltage, and
turn off the transistor when a level of a voltage obtained by adding the second slope voltage to the second reference voltage reaches a level of the feedback voltage.

* * * * *

UNITED STATES PATENT AND TRADEMARK OFFICE
CERTIFICATE OF CORRECTION

PATENT NO. : 8,742,743 B2  
APPLICATION NO. : 13/314279  
DATED : June 3, 2014  
INVENTOR(S) : Masao Seki Page 1 of 1

It is certified that error appears in the above-identified patent and that said Letters Patent is hereby corrected as shown below:

In the Specification

Column 13, line 61, replace "In" with "Ir1".

Column 13, line 63, replace "In" with "Ir1".

Column 14, line 34, replace "In" with "Ir1".

Column 14, line 40, replace "In" with "Ir1".

Signed and Sealed this  
Twenty-third Day of September, 2014

Michelle K. Lee  
*Deputy Director of the United States Patent and Trademark Office*